(12) United States Patent
Ramachandran et al.

(10) Patent No.: US 6,259,475 B1
(45) Date of Patent: Jul. 10, 2001

(54) VIDEO AND AUDIO TRANSMISSION APPARATUS FOR VEHICLE SURVEILLANCE SYSTEM

(75) Inventors: Natarajan Ramachandran, Uniontown; Philip Laier, Canton; Howard E. Antram, Alliance; Andrew Junkins, Copley; Arvind Srinivasan, Akron; Raymond J. Schuster, Lowellville, all of OH (US)

(73) Assignee: H. V. Technology, Inc., Uniontown, OH (US)

( * ) Notice: Subject to any disclaimer, the term of this patent is extended or adjusted under 35 U.S.C. 154(b) by 0 days.

(21) Appl. No.: 08/723,446

(22) Filed: Oct. 7, 1996

(51) Int. Cl.[7] .................................................. H04N 7/18
(52) U.S. Cl. ........................ 348/148; 348/149; 348/118; 348/117
(58) Field of Search .................................. 348/148, 113, 348/114, 115, 116, 117, 118, 149, 47; 340/901, 431, 435, 436, 903, 904; 455/89, 90, 95, 99

(56) References Cited

U.S. PATENT DOCUMENTS

| | | | |
|---|---|---|---|
| 3,868,743 | * 3/1975 | Kakizaki | 15/250.23 |
| 4,262,383 | * 4/1981 | Sohn | 15/250 |
| 4,789,904 | * 12/1988 | Peterson | 348/148 |
| 5,027,200 | * 6/1991 | Petrossian et al. | 348/148 |
| 5,111,289 | * 5/1992 | Lucas et al. | 348/148 |
| 5,264,962 | * 11/1993 | Kho | 15/250.05 |
| 5,289,321 | * 2/1994 | Secor et al. | 348/148 |
| 5,467,264 | * 11/1995 | Rauch et al. | 364/141 |
| 5,550,677 | * 8/1996 | Schofield et al. | 359/604 |
| 5,574,443 | * 11/1996 | Hsieh | 340/435 |
| 5,596,228 | * 1/1997 | Anderton et al. | 357/714 |
| 5,642,238 | * 6/1997 | Sala | 348/148 |
| 5,670,935 | * 9/1997 | Schofield et al. | 340/435 |
| 5,677,667 | * 10/1997 | Lesesky et al. | 455/90 |
| 5,729,016 | * 3/1998 | Klapper et al. | 348/148 |
| 5,760,828 | * 6/1998 | Cortes | 348/148 |
| 5,793,300 | * 8/1998 | Suman et al. | 340/825.2 |

* cited by examiner

*Primary Examiner*—Anand S. Rao
(74) *Attorney, Agent, or Firm*—Ralph E. Jocke

(57) ABSTRACT

A video-audio surveillance system for a motor vehicle is suitable for observing blind spots as well as for providing security for the vehicle and its contents. The system includes audio-video transmission modules positioned at selected locations on the exterior and interior of the vehicle. An operator or observer either in the vehicle or otherwise monitors the video and audio signals from the modules through a monitoring unit.

37 Claims, 28 Drawing Sheets

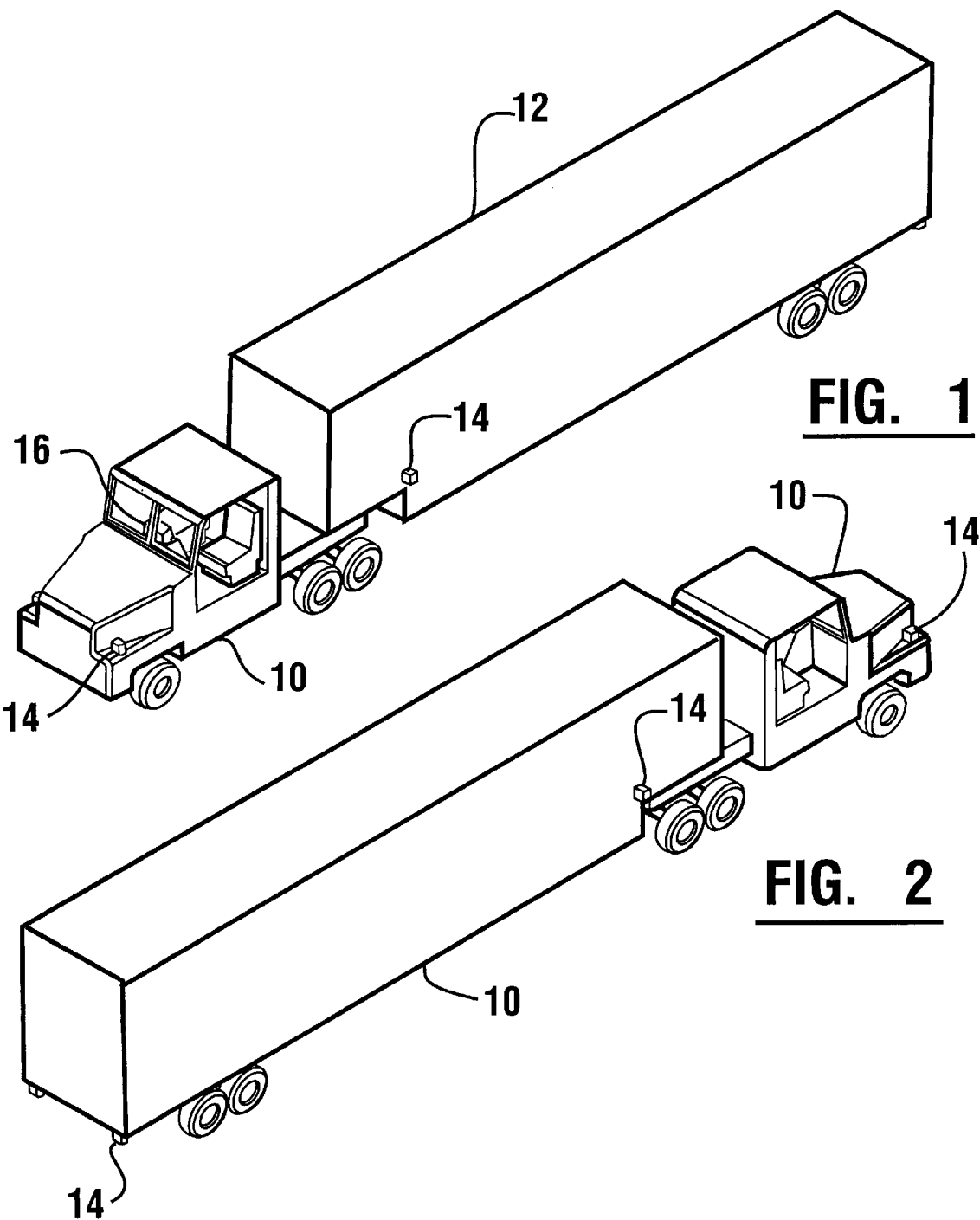

Audio-Video RF Transmitter/Receiver System
Utilizing the Vehicle DC Power Supply Audio-Video RF Transmitter/Receiver System
Utilizing an Independent DC Power Supply Switching Module

DECODER SWITCH

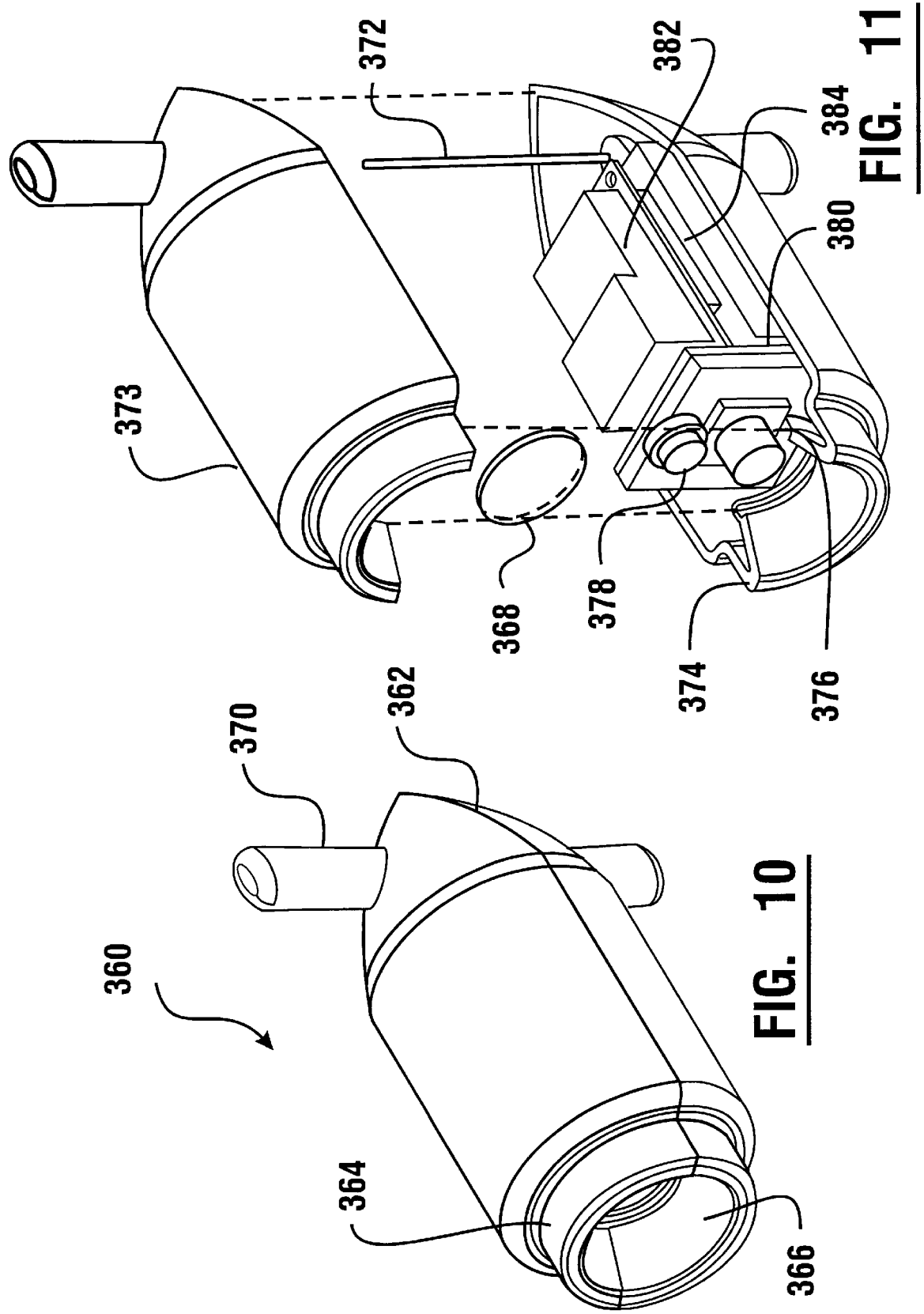

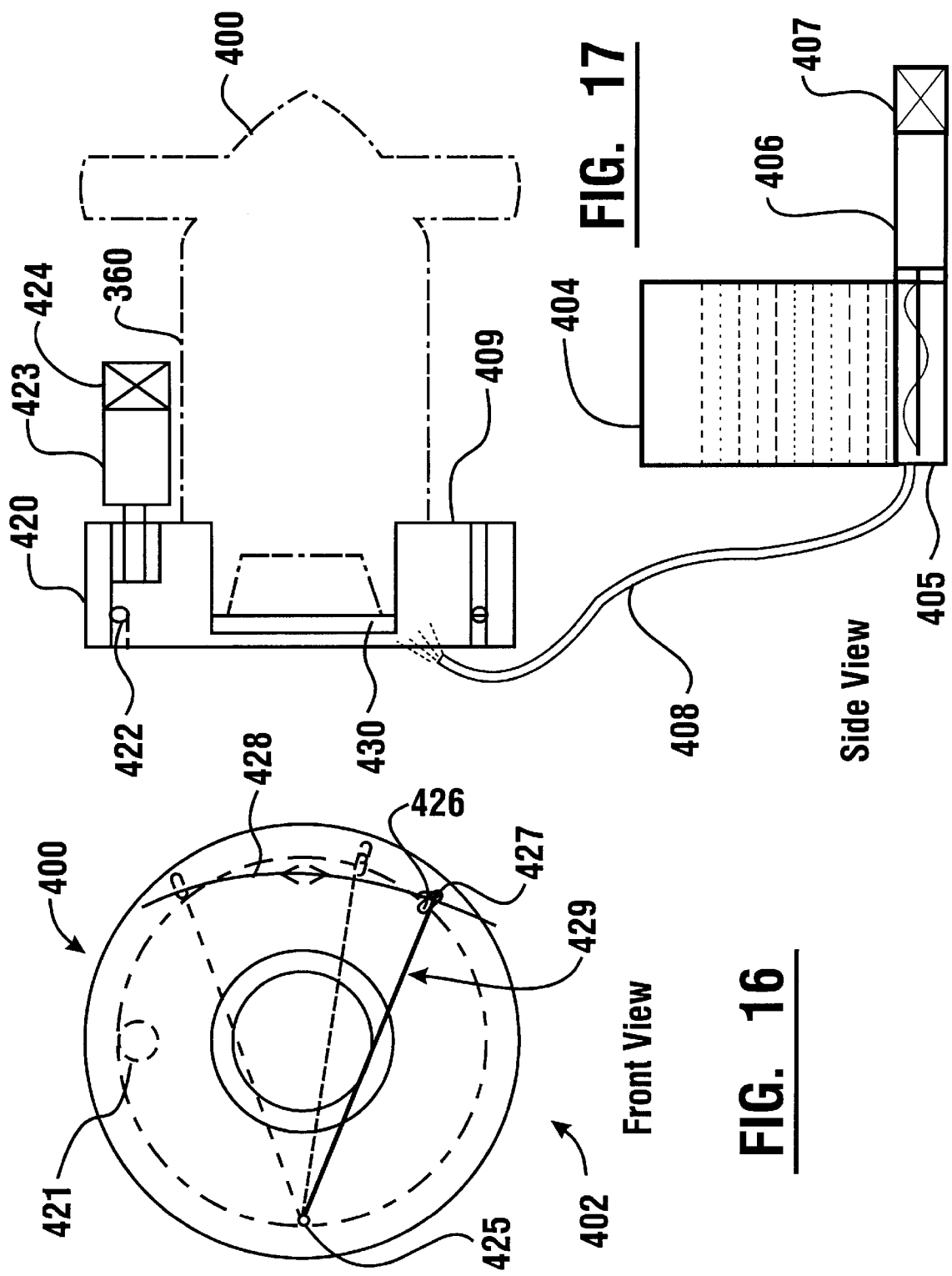

VIDEO AND AUDIO TRANSMISSION APPARATUS FOR VEHICLE SURVEILLANCE SYSTEM

TECHNICAL FIELD

This invention relates to motor vehicles. Specifically this invention relates to a system that enables an operator of a motor vehicle, such as a tractor trailer, recreational vehicle, trailer, bus, van, farm or construction equipment to view and hear sounds in the area surrounding the vehicle as well as in areas of the vehicle located remotely from the operator.

BACKGROUND ART

Motor vehicles, particularly large vehicles such as trucks, recreational vehicles, buses, etc. have certain areas known as "blind spots." These blind spots are areas where it is difficult or impossible for an operator sitting in the driver seat of the vehicle to observe. Blind spots may exist on the sides or at the rear of a large vehicle. Other blind spots are often in areas at the front or rear of the vehicle as well as underneath the vehicle. It is important that a driver be able to view the blind spots to prevent accidents when the vehicle is in motion. In addition, it is important for the driver to view such blind spots to avoid attack or vandalism while the vehicle is parked.

Prior art efforts related to allowing drivers to view blind spots have included the use of mirrors at various locations on the vehicle. Mirrors enable the driver to better see the areas in the front and to the sides of the vehicle. Such mirror systems typically involve parabolic lenses that provide the driver with a distorted view.

Unfortunately, it is impossible to use mirrors to enable a driver to see certain areas around the vehicle. For example, a mirror system cannot be used to view the area directly behind or underneath a semi-trailer. In viewing the rear area of a vehicle, some have suggested the use of closed-circuit TV cameras. The use of such closed-circuit TV cameras has posed problems however. These problems have included the need for special dedicated wiring in the vehicle to operate the camera and to transmit signals. Such wiring is expensive to retrofit in a vehicle and also requires special connections when the camera is on a trailer or similar unit that is separable from a tractor or other unit that holds the driver. Such closed-circuit TV camera systems also present problems with regard to providing a limited field of view that may not represent what a driver is accustomed to seeing in a rear-view mirror. This is because the camera does not provide a reversed image. In addition, the proper functioning of cameras requires the maintenance of suitable environmental conditions within the camera housing that is difficult to maintain in cold or wet conditions.

A further drawback associated with closed-circuit TV cameras is that they are exposed to a variety of lighting conditions. For example, sun-glare can have the effect of "blinding" the camera, particularly during the hours near sunrise and sunset. After dark, the headlights of other vehicles present a sharp contrast to the surrounding darkness and can often result in a blinding effect. Cameras have not been placed near the underside of motor vehicles because of shadows and generally insufficient light for viewing in these areas. All of these factors have traditionally made closed-circuit television systems unsatisfactory in motor vehicles.

There is also a growing trend toward making the cabins of motor vehicles quieter. This is necessary, both to protect the hearing of the operator as well as to avoid fatigue that may result from noise and vibration. Long distance driving in large vehicles is often very fatiguing and significant sound and vibration increase the fatiguing effect. The need for temperature control within the cab of the motor vehicle has resulted in such vehicles typically being operated with the windows up. This further helps to reduce the sound level within the cab.

An unfortunate drawback that comes with the advantages of having a quiet and environmentally controlled space for the driver, is that the driver is not aware of many sounds surrounding the vehicle. This presents problems in a number of circumstances. Such circumstances include when the vehicle is near a railroad crossing and the noise or horn of an oncoming train cannot be readily heard in the cab of the vehicle. In addition, pedestrians who are in the vicinity of the vehicle may not be visible to the driver, but may be struck when the vehicle begins to move. The noise being made by the pedestrians can help the driver discern their location.

Vandals who might attack a vehicle when it is sitting in a rest area or at a stop light cannot be heard approaching from the sealed cab. In addition, it is also often helpful to have an individual on the ground to guide the driver when backing the vehicle into a loading dock or moving it onto a rail car. However, such an individual may not be readily heard from the driver's position in many circumstances.

A further problem with existing closed-circuit cameras is that they require enclosures that are of significant size. It is readily apparent to anyone observing the vehicle that the enclosure houses a TV camera. As a result, vandals are often prone to stealing the cameras and enclosures when the vehicle is parked or not attended.

Thus, there exists a need for a system and devices that enable an operator of a motor vehicle to view the areas surrounding the motor vehicle, particularly the blind spots. Further there is a need for a system and devices that enable the operator of a motor vehicle to hear the sounds adjacent to the motor vehicle to avoid accidents and vandalism. There is further a need for systems and components that can withstand the harsh environmental conditions commonly encountered on a motor vehicle and which can be packaged in a manner that prevents their detection by vandals and others.

DISCLOSURE OF INVENTION

It is an object of the present invention to provide a system for viewing in the blind spots surrounding a motor vehicle.

It is a further object of the present invention to provide a system for detecting sounds outside of a motor vehicle.

It is a further object of the present invention to provide a system that enables an operator of a motor vehicle to view and hear the sounds from a plurality of locations surrounding the motor vehicle.

It is a further object of the present invention to provide a system for viewing and hearing in the areas surrounding a motor vehicle, which may be readily installed or incorporated on existing vehicles.

It is a further object of the present invention to provide a camera and microphone enclosure that has a controlled interior environment.

It is a further object of the present invention to provide a video camera and audio detection unit that may be made integral with other structures on the vehicle so as to avoid its detection.

It is a further object of the present invention to provide a video camera and audio detection unit that avoids fouling by dirt and other contaminants.

It is a further object of the present invention to provide a monitoring unit for monitoring video and audio signals from a plurality of detecting units on a motor vehicle.

It is a further object of the present invention to provide a monitoring unit that can selectively scan signals from a plurality of audio-video detecting units on the motor vehicle.

It is a further object of the present invention to provide a monitoring unit that includes a controlled audio output from a plurality of audio detection units.

It is a further object of the present invention to provide a monitoring unit that may selectively reverse the images from a plurality of video camera transmission units so as to provide a "mirror image" display.

Further objects of the present invention will be made apparent in the following Best Modes for Carrying Out Invention and the appended Claims.

The foregoing objects are accomplished in a preferred embodiment of the present invention by a system that includes a plurality of audio-video transmission modules and a monitoring unit that include a display positioned adjacent to a driver of a motor vehicle. The monitor selectively displays video images from the audio-video transmission modules. The monitoring unit also has a speaker that outputs sound signals from selected audio-video transmission modules.

Each audio-video transmission module includes a miniature video camera and microphone. The audio-video transmission module is sufficiently miniaturized in one preferred embodiment so as to be incorporated into a housing of another device such as a tail light or clearance light housing which would normally be present on the motor vehicle. Incorporation of the audio-video transmission module into a common light housing makes the cameras less conspicuous and minimizes the risk of vandalism.

Each audio-video transmission module includes a transmitter that transmits both audio and visual signals. The transmitters of each audio-video transmission module may transmit on the same or different frequencies depending on the type of system. The audio-video transmission modules are connected to the vehicle electrical system through the wiring harness for the tail lights, brake lights or clearance lights found in the housing. As a result, the necessary power for operating the camera, microphone and transmitter in the modules is available from the vehicle electrical system. Further power from the vehicle's electrical system may be used to operate heating and/or cooling devices within the interior of the housing of the module so as to maintain a suitable operating environment for the electronic components.

In embodiments of the invention, the audio-video transmission modules may be controlled through a switching system that operates using signals on the existing wiring of the motor vehicle. A switching control system associated with the monitor imposes a digital signal onto the electrical wiring harness of the vehicle. These digital signals are specifically programmed to cause the audio-video transmission modules to turn off or on. The circuitry in each audio-video transmission module receives the signals imposed on the electrical lines of the vehicles by the monitoring unit. If the signals correspond to the programmed instructions to turn the particular audio-video transmission module on or off, the module complies with the command. This enables the operator of the vehicle to sequentially operate the modules. As a result, they may all transmit video and audio signals on the same frequency without interference with one another.

Embodiments of the invention may further include audio-video transmission modules positioned on the underside of the vehicle pointed in either of the forward or rearward directions. This enables the monitoring of workers, pedestrians or children in locations underneath the vehicle. Other alternative embodiments may involve placement of an audio-video transmission module adjacent to the top surface of the vehicle. This enables the operator to avoid collisions with low-lying obstructions.

Further embodiments of the invention include incorporation of re-chargeable or other batteries or other power sources into the audio-video transmission modules. This enables the modules to operate during time periods when the modules are separated from the vehicle power source. This may include times when the vehicle is not running or when power to the other components in the enclosure which houses the transmitter is cut off. Additionally, the present invention may be used to help semi-tractor and trailer operators who need to hook up to a separated semi-trailer by helping to align them during backing. This can be accomplished using the remotely powered audio-video transmission modules. Of course, once the trailer is connected to the rest of the vehicle electrical system, the batteries in the audio-video transmission modules can be recharged.

Further embodiments of the invention may include audio-video transmission modules for monitoring the interior spaces of a trailer or bus. This may for example enable an operator of a motor vehicle to view the condition of an animal or livestock being carried in a trailer. It also had the potential for indicating when vandals are attempting to break into a trailer parked either in a rest area or in traffic. The modules can be used to monitor the activities of passengers on a bus. Monitoring may be accomplished from another area or vehicle that is not physically connected to the vehicle being monitored. The remote power source capabilities of the audio-video transmission modules also enable security forces within a facility that handles semi-trailers to monitor activity in the interior of a plurality of trailers. Such monitoring may include the detection of vandalism as well as fires or explosions. To further enhance such monitoring, the audio-video transmission module of the present invention may include motion, sound, temperature, smoke or flame detectors so that the transmission is initiated only upon the sensing of some abnormal activity.

BRIEF DESCRIPTIONS OF DRAWINGS

FIG. 1 is an isometric view of a semi-tractor and trailer incorporating the video-audio surveillance system of the present invention.

FIG. 2 is an opposite hand isometric view of a semi and tractor trailer incorporating the present invention.

FIG. 10 is an isometric view of a third embodiment of an enclosure for an audio-video transmission module.

FIG. 11 is an exploded isometric view showing the components of the audio-video transmission module shown in FIG. 10.

FIG. 16 is a front view of a lens cleaning apparatus for an audio-video transmission module.

FIG. 17 is a side schematic view of the lens cleaning apparatus shown in FIG. 16 and cleaning spray delivery apparatus.

BEST MODES FOR CARRYING OUT INVENTION

Figure 3:
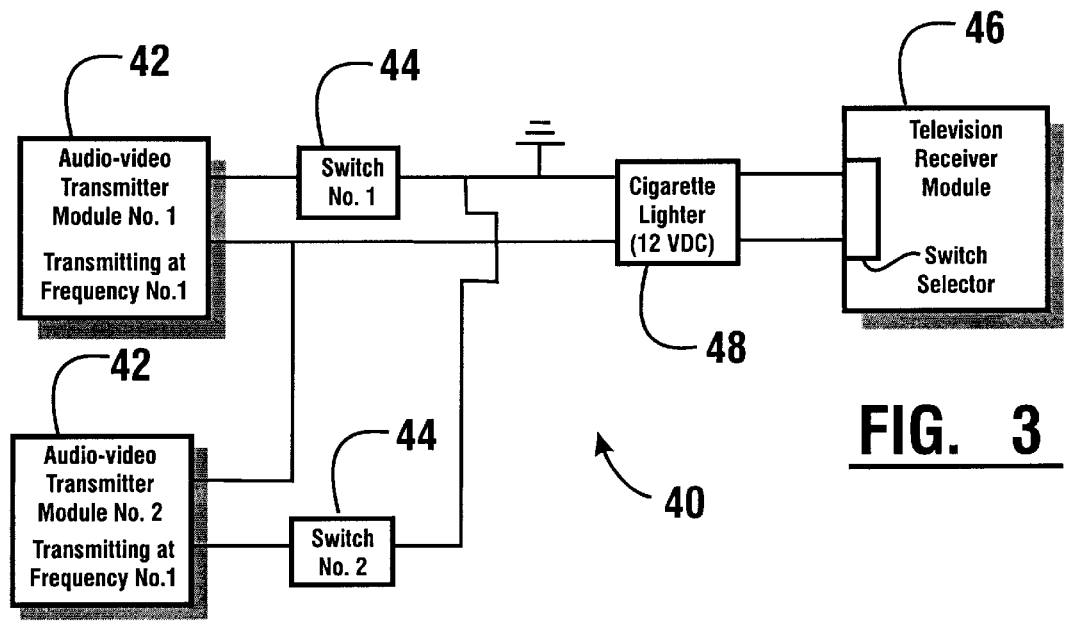
FIG. 3 is a schematic view of a first simplified form of the video-audio surveillance system of the present invention.

Referring now to the drawings and particularly to FIG. 1 there is shown therein an isometric view of a semi-tractor 10 in connection with a semi-trailer 12 that incorporates an embodiment of the audiovisual surveillance system of the present invention. The opposite hand view of the semi-tractor and trailer is shown in FIG. 2. The system includes a plurality of audio-video transmission modules 14. The audio-video transmission modules, which are described in detail hereafter, each includes a miniature camera and microphone. Each audio-video transmission module includes a transmitter for transmitting the pictures from its camera and the sounds from its microphone via radio frequency. In the form of the invention shown each audio-video transmission module is incorporated into a housing for a tail light, turn signal or clearance light mounted on the tractor or trailer. As hereinafter discussed, this minimizes the risk of vandalism.

The signals from the audio-video transmission modules are received in the cab of the tractor by a monitoring unit 16. As hereinafter described in detail, monitoring unit 16 includes a CRT screen, an audio speaker, as well as circuitry to accomplish switching and picture inversion to facilitate the driver's viewing and hearing from the plurality of audio-video transmission modules.

The audio-video surveillance system of the present invention may be configured to operate using different approaches. A first embodiment of the invention is schematically shown in FIG. 3. In this embodiment generally indicated 40, the transmitters and other electronic equipment housed within the audio-video transmission modules are operated directly from the power supply of the motor vehicle. This includes operating each audio-video transmission module 42 from power obtained from the vehicle's DC power supply that is typically a 12-volt system.

In one preferred form of the invention, the audio-video transmission modules obtain their power from the same lines that operate the clearance lights, tail lights, turn lights, backup lights and other items typically found in the light enclosures that also house the transmitter, camera and microphone. Typically in such systems power is always available at the bulbs, and the bulbs are turned on by completing a ground circuit. In such configurations it is a simple matter to pull sufficient power from the existing lines to operate the electronics of the transmission module.

In those systems that are configured to power the lighting circuits by supplying a powered connection to the bulbs when the lights are to be turned on, power may be provided within the transmission module. This may be done by running a separate power line from the vehicle electrical system. However this is more preferably done by including a power source within the housing such as a re-chargeable battery so as to always have power available at the transmission module. The rechargeable battery may then be recharged during the time periods that power is supplied to the enclosure. Another approach with regard to those systems where power is not always provided to lighting enclosures is to configure the vehicle to operate with full time running lights. This will not only increase safety but also assures an adequate supply of power for the audio-video transmission modules 42.

In the system 40 shown in FIG. 3 each transmission module 42 is connected with a switch module 44. Switch module 44 is incorporated into the enclosure with the transmitter module and is connected on the power line with the vehicle electrical system. As hereinafter described, signals superimposed on the vehicle power lines provide for selectively switching circuitry in switch module 44 on and off in response to receipt of predetermined signals.

The monitoring unit 46 includes switching circuitry that is in connection with the vehicle electrical system through its power source. Preferably the power source includes a simple connection with the cigarette lighter 48 of the vehicle. The electrical connection through the cigarette lighter enables not only providing the monitoring unit with the power necessary to display the images from the audiovisual transmission modules 42, but also as a gateway to input the signals for turning switch modules 44 on and off into the vehicle electrical circuitry. An advantage in operating a system of the type shown in FIG. 3 is that it is possible to turn the switch modules 44 on and off sequentially so that only one transmission module 42 is transmitting at any given time. This enables all of the transmission modules to transmit on the same frequency. It also simplifies the circuitry of the monitoring unit by requiring it to only receive at one frequency. Because only one transmission module operates at a time, it reduces power consumption.

Figure 5:
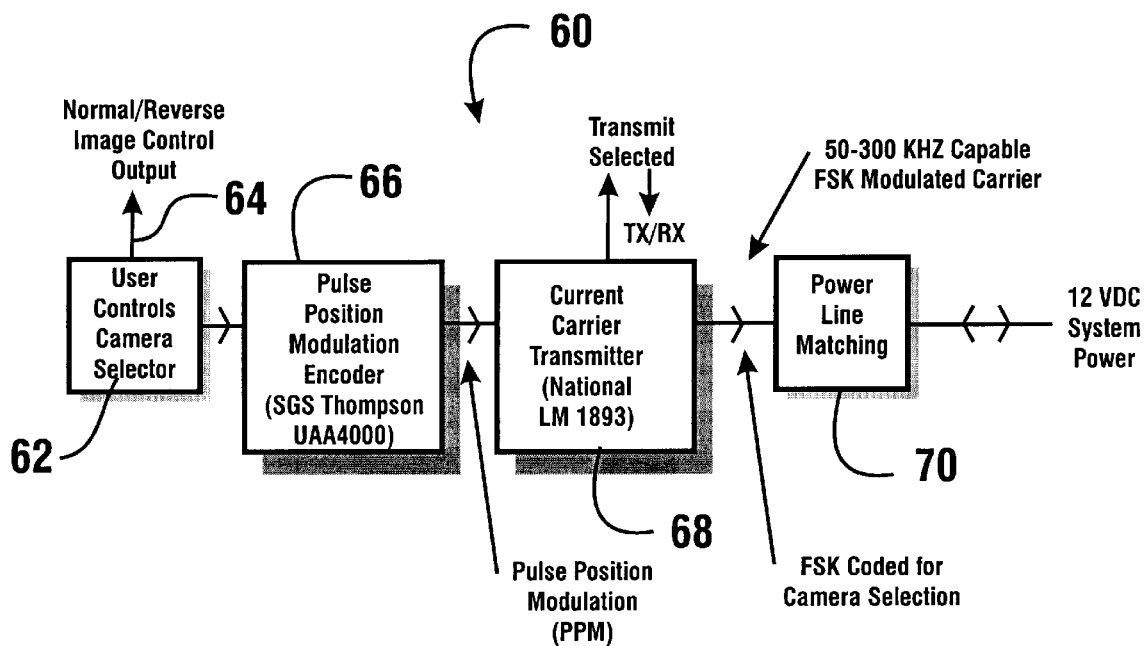
FIG. 5 is a schematic view of the circuitry in the monitoring unit of the present invention used for controlling the audio-video transmission modules.
Figure 6:
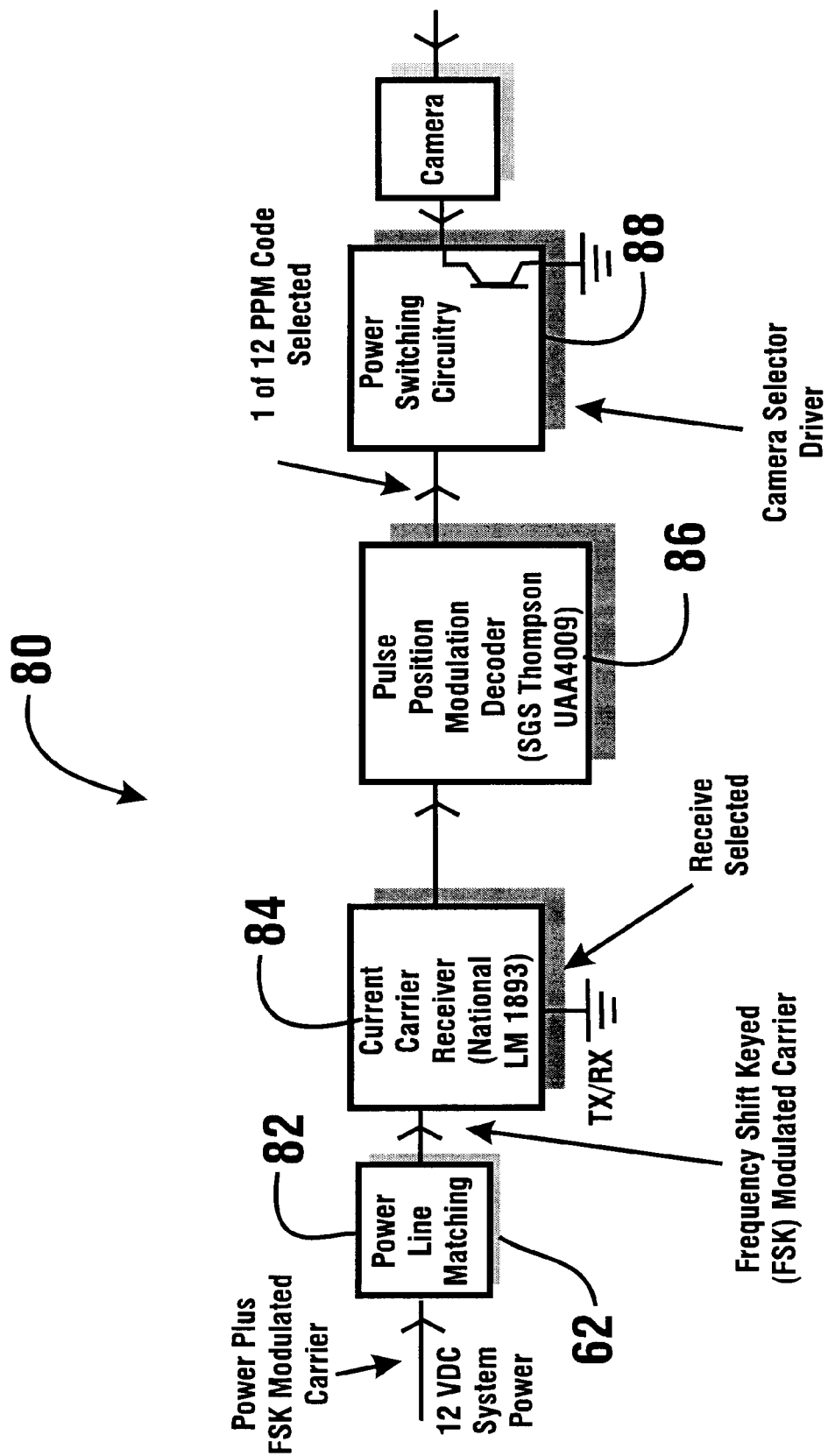
FIG. 6 is a schematic view of the circuitry used in the audio-video transmission modules of the present invention to decode the signals sent by the monitoring unit.

The switching control achieved by system 40 is schematically demonstrated in FIGS. 5 and 6. The switching module generally designated 60 is generally associated with the monitoring unit 46. The switching module includes a subsystem 62 that is controlled by the operator. The control subsystem 62 typically provides a signal that represents the particular audiovisual transmission module that is to be viewed at any one time. This signal may be based on input from the operator or it may result from automatic periodic scanning that the operator has programmed in switching module. The control module also outputs signals as indicated by line 64 that are used to control the output on the monitor and specifically the reversal of the camera images. The control subsystem also outputs signals for control of the lens cleaning mechanisms of the various audio-video transmission modules as later discussed.

The control subsystem 62 of the switching module outputs a signal representative of the audiovisual transmission module desired to be displayed to a pulse position modulation encoder 66. The pulse position modulation encoder 66 in the preferred embodiment is of a type UAA 4000 made by the SGS Thompson Company. Encoder 66 outputs a pulse position modulation signal into a current carrier transmitter 68. The current carrier transmitter 68 in the preferred embodiment is of the Type LM 1893 made by National Semiconductor. The current carrier transmission module outputs a signal in the form of a frequency shift key modulated carrier. In the preferred form of this invention, the frequency is in the range of 50 to 300 kilohertz.

The current carrier transmitter is connected to a power line matching system 70. The circuitry in the power line matching system matches the 12-volt system of the vehicle and enables the frequency modulated carrier to be transmitted therein.

In operation, each of the audiovisual transmission modules has a particular frequency signal that must be received for it to turn on its associated switch. Likewise, when the control unit desires to shut that particular transmission module off and turn on another, the switching module 60 transmits the specific frequency signal that shuts off the transmission module that has been on, and then transmits the signal that turns on the next desired module.

The decoder switch in each transmission module is schematically shown in FIG. 6. The decoder switch generally indicated 80, includes a power line matching system 82 in connection with a 12-volt power line of the vehicle system. The power line matching circuitry 82 transmits the frequency carrier signal to a current carrier receiver 84. In the preferred form of the invention the current carrier receiver is a model LM 1893 made by National Semi-conductor. The signal from the current carrier receiver is transmitted to a pulse position modulation decoder 86 that in the preferred form of the invention is a model UAA 4009 made by the SGS Thompson Company.

In response to the pulse position modulation decoder receiving a signal that corresponds to that which is programmed to turn the camera on, the decoder 86 outputs a signal to the power switching circuitry 88 that powers the camera, microphone and transmitter. Likewise, the receipt of a signal from the decoder 86 to turn the items off is transmitted to the power switching circuitry. In response to such a signal, the camera, microphone and transmitter are shut off.

An advantage of this system is that the frequency shift keyed modulated carrier signals can be transmitted on all 12-volt lines of the vehicle. They are received throughout the vehicle and do not interfere with the normal on and off signals that are necessary for the electric lines to perform their functions. As a result, in the configuration of the system shown in FIG. 3, all of the audiovisual transmission modules can receive the same signals and each can be turned off or turned on as desired by the operator of the vehicle.

Figure 4:
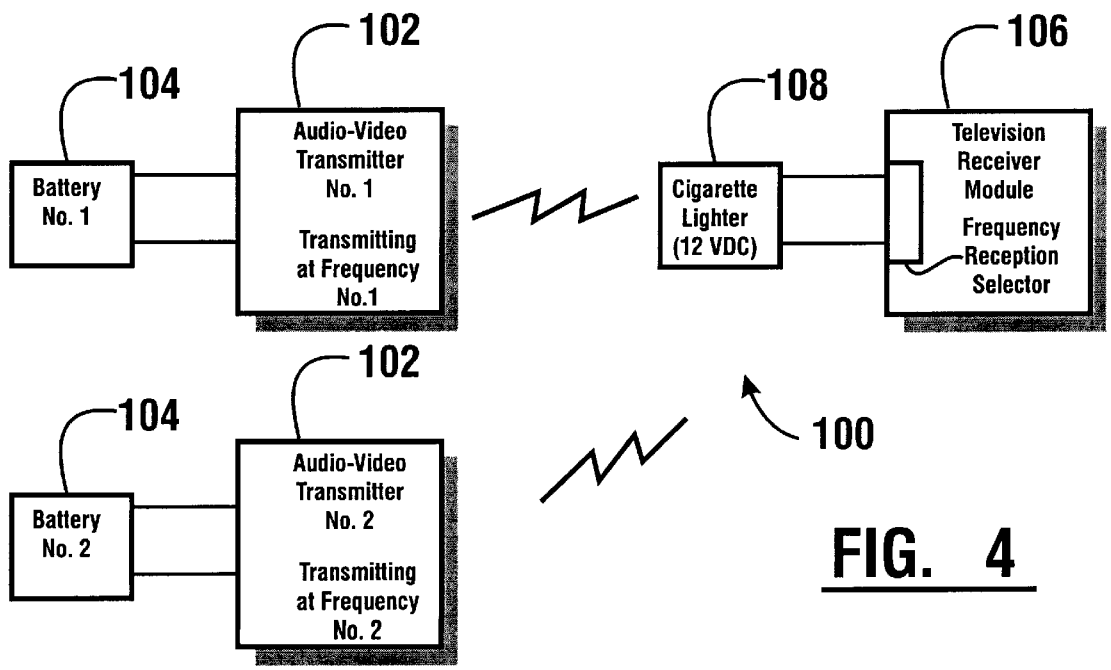
FIG. 4 is a simplified schematic view of an alternative form of the video-audio surveillance system of the present invention.

An alternative form of the invention is shown schematically in FIG. 4. This alternative form of the invention generally indicated 100 includes audio-video transmission modules 102 that is each powered by an independent power supply 104. The independent power supply may be a re-chargeable or other battery associated with the transmission module. Alternatively, there may be a common power supply such as the battery of a refrigeration unit that is associated with a semi-trailer that periodically runs to keep the contents of the trailer cool.

Significant to the operation of the system 100 shown in FIG. 4 is that each of the audiovisual transmission modules transmits on a different frequency. The different frequency signals received from the transmitter modules 102 are received by a monitoring unit 106. Monitoring unit 106 is similar to monitoring unit 46 of the previously described embodiment in that it is powered from the vehicle electrical system, such as through a connection with a cigarette lighter 108. However unlike the monitoring unit of system 40, monitor 106 includes a frequency selector that enables the monitor to receive signals at the various frequencies at which the transmitter modules 102 transmit. One form of the invention in which the audio-video transmission modules transmit at selected frequencies in a range from 900 to 930 MHz has been found to perform satisfactorily.

Figure 12:
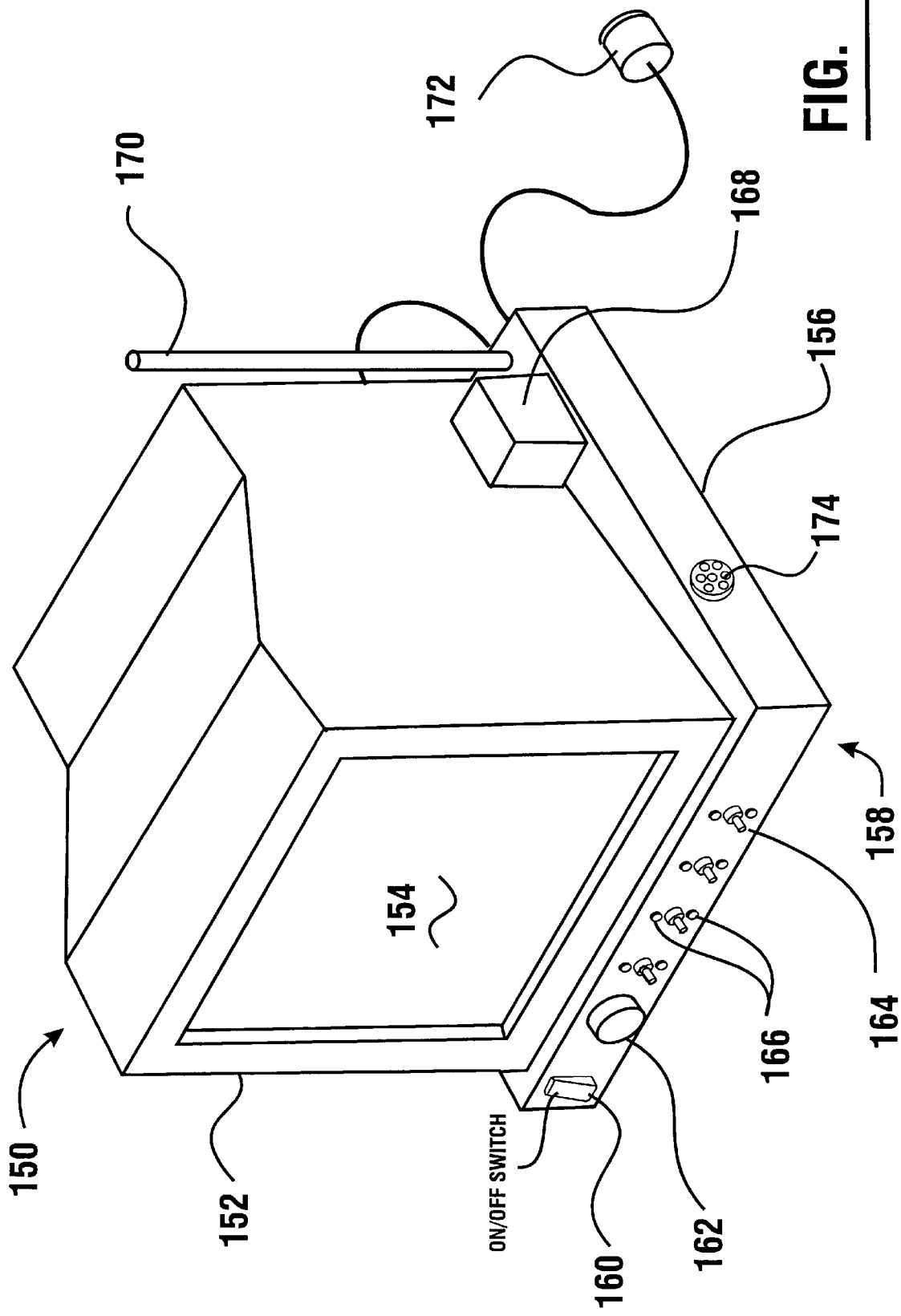
FIG. 12 is an isometric view of the monitoring unit and control module of the preferred embodiment of the present invention.

An example of a monitoring unit 150 is shown in FIG. 12. Monitoring unit 150 may be of the type used with switching system 40 in which all the audio-video transmission modules transmit on the same frequency. Alternatively, monitoring unit 150 may be configured to operate with system 100, in which each of the transmission modules transmit on different frequencies. Regardless of the system type, the monitoring unit has similar features except for the transmitter module selection circuitry.

The monitoring unit 150 includes a CRT enclosure 152 that houses a screen 154. Screen 154 displays the images from the transmission modules. Monitoring unit 150 also includes a receiver unit generally indicated 156. The receiver unit 156 includes a control panel 158 that has a plurality of switches thereon. The control panel 158 includes a switch 160 for turning the system on and off. A push-button 162 may be manually pushed by an operator to select the audio-video transmission module, whose output will appear on the screen.

In the preferred form of the invention, each transmission module in the system has an associated selection switch 164 on the control panel. Each selection switch 164 has a pair of LED indicators 166 adjacent thereto. The LED indicators are designed to indicate to the operator which transmission module is providing the displayed image as well as whether the picture being shown is normal or reversed. Pressing the associated selector switches 164 changes the given display from the transmission module from the normal to the reversed condition in a manner hereinafter discussed.

The monitoring unit also includes a switching module 168 to accomplish switching either of the frequency type or of the signal line transmission type depending on the type of system used. The monitoring unit also includes an antenna 170 for receiving signals from the transmitter modules. A power plug 172 is adapted for plugging into the cigarette lighter to obtain power. In the systems in which switching signals are transmitted in the electrical lines of the vehicle, the power plug imparts the signals necessary to switch the transmission modules. The receiver 156 also includes a speaker 174 as schematically shown, reproducing the sounds from the microphones in the transmission modules.

Figure 18:
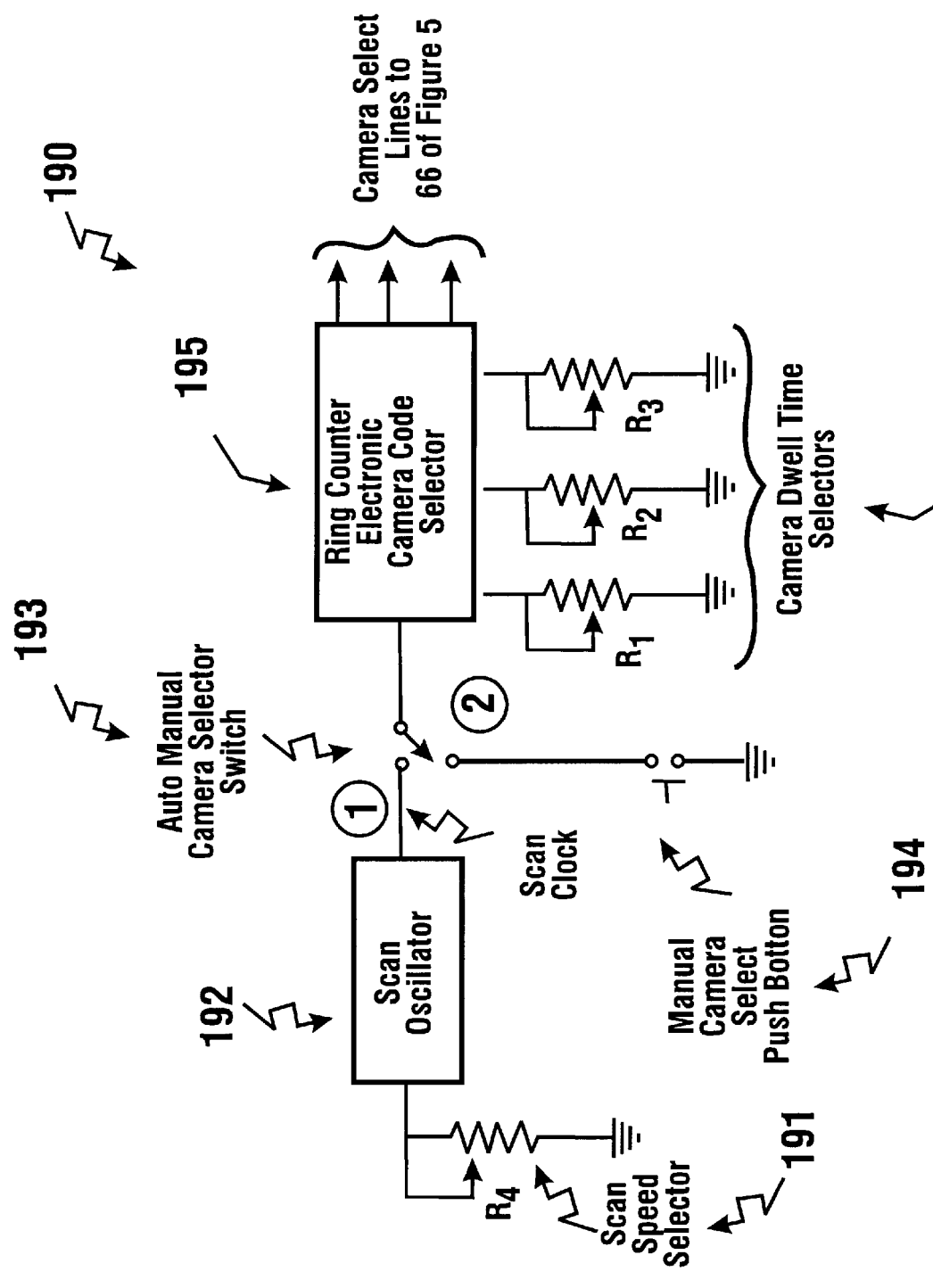
FIG. 18 is a schematic view of the circuitry for selectively scanning between various transmission modules with programmable timing cycles.

The monitoring unit of the present invention may also include circuitry for the operator to selectively scan between the various transmission modules instead of repetitively pushing the selector button 162. In such cases, controls are provided through which the operator may program a timing cycle for monitoring any two or more of the transmission modules, as well as the dwell time between the modules. The circuitry for accomplishing this is shown schematically in FIG. 18 and is generally designated 190.

The circuit 190 includes an auto/manual selection switch 193. The switch enables selective delivery of camera selection signals from either a manual camera selection button 194 or a scan oscillator 192. The scan oscillator 192 submits signals at a rate that is selectively controlled by a potentiometer 191.

The signals passed through switch 193 are delivered to a ring counter 195. The ring counter is connected with dwell time potentiometers 196. Although in FIG. 18, three dwell time potentiometers are shown, in other embodiments other numbers of such dwell time controls may be used to match the number of audio-video transmission modules to be cycled. The ring counter delivers signals to a pulse position modulation encoder such as encoder 66 in FIG. 5.

In operation with switch 193 set to "manual" as reflected in position "2," modules may be selected by an operator by pressing button 194 to cycle to the desired module. With the switch 193 set to automatic that is position "1," cameras are cycled by signals delivered from the scan oscillator. The setting on scan speed potentiometer 191 controls the overall scan speed. The settings at potentiometers 196 associated with the ring counter control the dwell time for each module.

The receiver 156 of the preferred embodiment also provides image selection so that the monitor may display either a normal or inverted image from a transmission module. An inverted image provides an image similar to what the operator would be accustomed to seeing by looking in a rear-view mirror. The circuitry associated with achieving image reversal is schematically shown with regard to FIG. 19. In this form of the invention, the scanning synchronization of the monitor is modified so as to achieve image reversal. A video monitor is normally designed to scan from left to right, top to bottom in synchronization with the video camera. Selection of the inverted image causes the monitor to scan right to left, top to bottom in synchronization with the video camera. This is accomplished by reversing the signals submitted to the horizontal deflection coil of the CRT.

Figure 19:
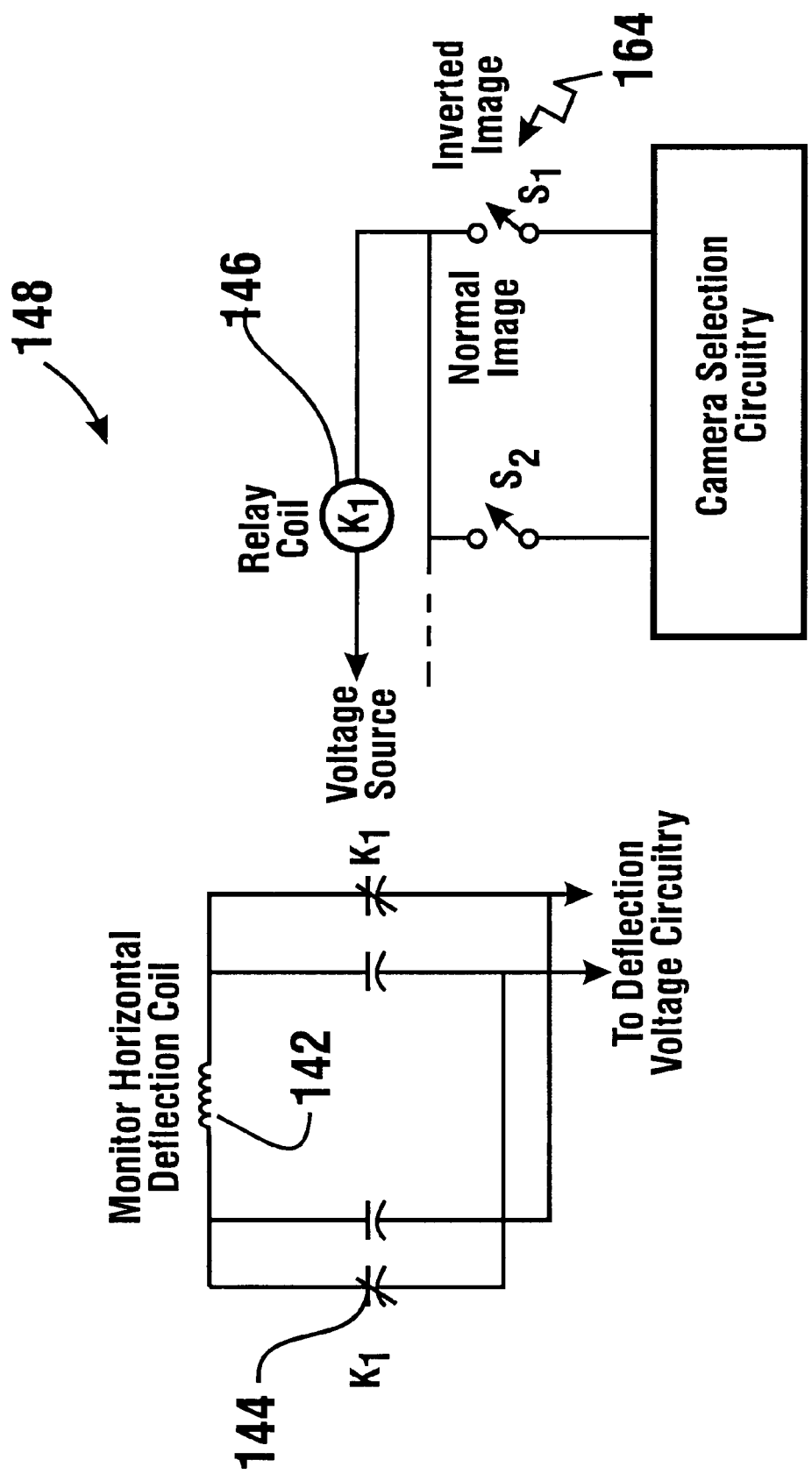
FIG. 19 is a schematic view of circuitry to provide either normal or inverted images of an observed object on a monitoring unit.

The video inversion circuit that reverses signals to the horizontal deflection coil of the CRT is shown in FIG. 19 and is generally indicated 148. Selection switch 164 enables selective actuation of a coil 146 of a relay. Energizing coil 146 changes the conditions of relay contacts 144 that reverses the current flow through the horizontal deflection coil 142. As a result the actuation of switch 164 reverses image displayed on the CRT.

Figure 20:
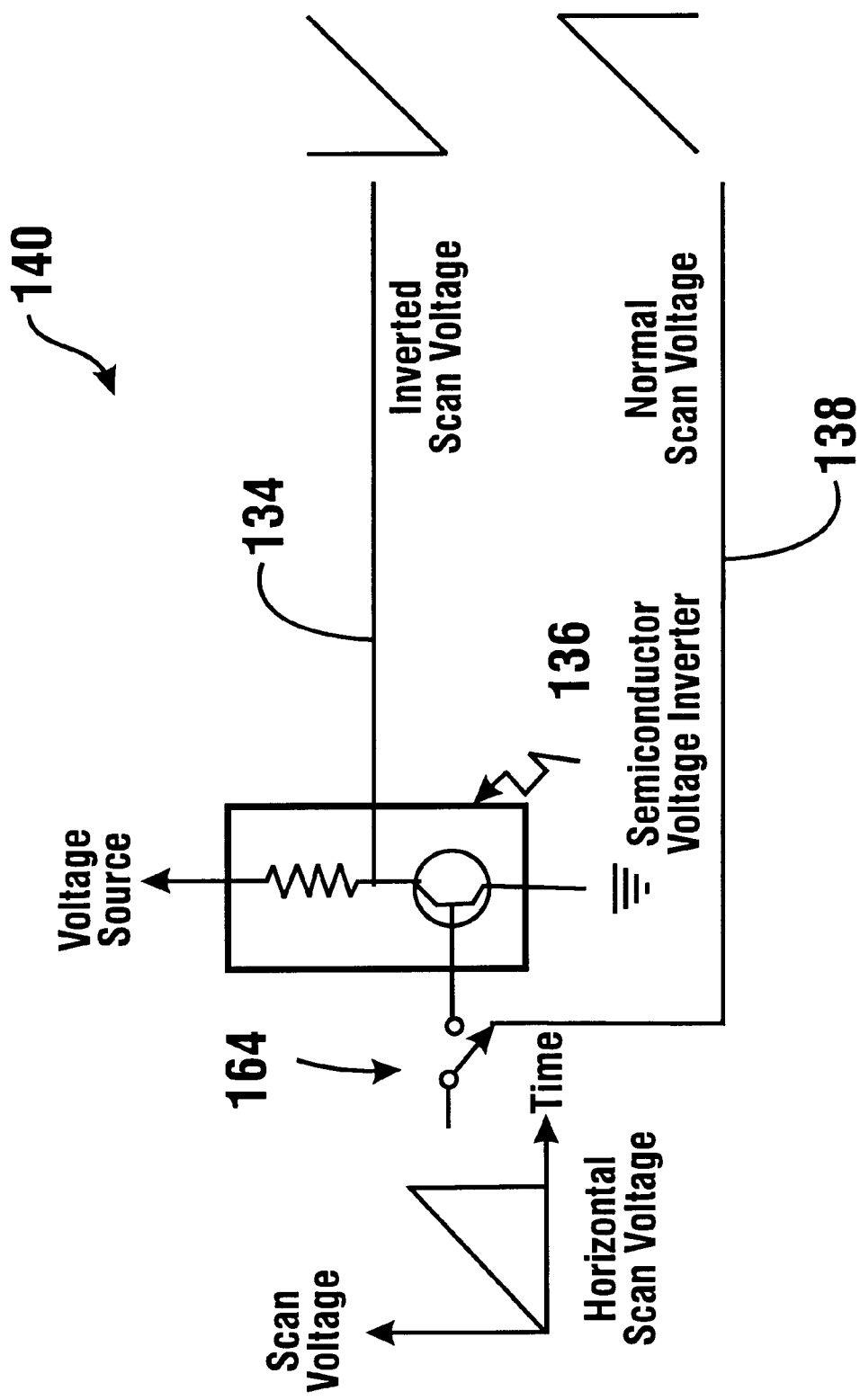
FIG. 20 is a schematic view of alternative circuitry to provide either normal or inverted images of an observed object on a monitoring unit.

Alternatively, inversion of the video image may be accomplished by inversion of the saw tooth wave form that is delivered to the horizontal output driver that drives the CRT. Circuitry suitable for accomplishing that is schematically described in FIG. 20 and is generally designated 140.

The saw tooth inversion circuitry 140 includes image selection switch 164. Switch 164 selectively routes the scan voltage to the CRT in a normal manner on a line 138 or a semiconductor voltage invertor 136. Voltage invertor 136 is connected to a voltage source and to ground on opposed sides. The output from invertor 136 is output to the CRT on a line 134 that is the inverted voltage of the original signal. By delivering the inverted scan voltage the image output from the CRT can be reversed.

The monitoring unit 150 also provides audio signals from the various audio-video transmission modules that are delivered through speaker 174. Because the microphones in the enclosures of the transmission modules may experience noises commonly associated with road noise and wind noise, the audio signals from the microphones are filtered. The purpose of the filters is to enable the operator to hear the sound associated with unusual circumstances such as individuals talking or approaching, while reducing undesirable sounds. Further, it may be desired to essentially "turn up" the sound while preventing damage to the system as a result of excessively high noises, such as a tire blowout or the blowing of a horn on an adjacent truck.

Figure 21:
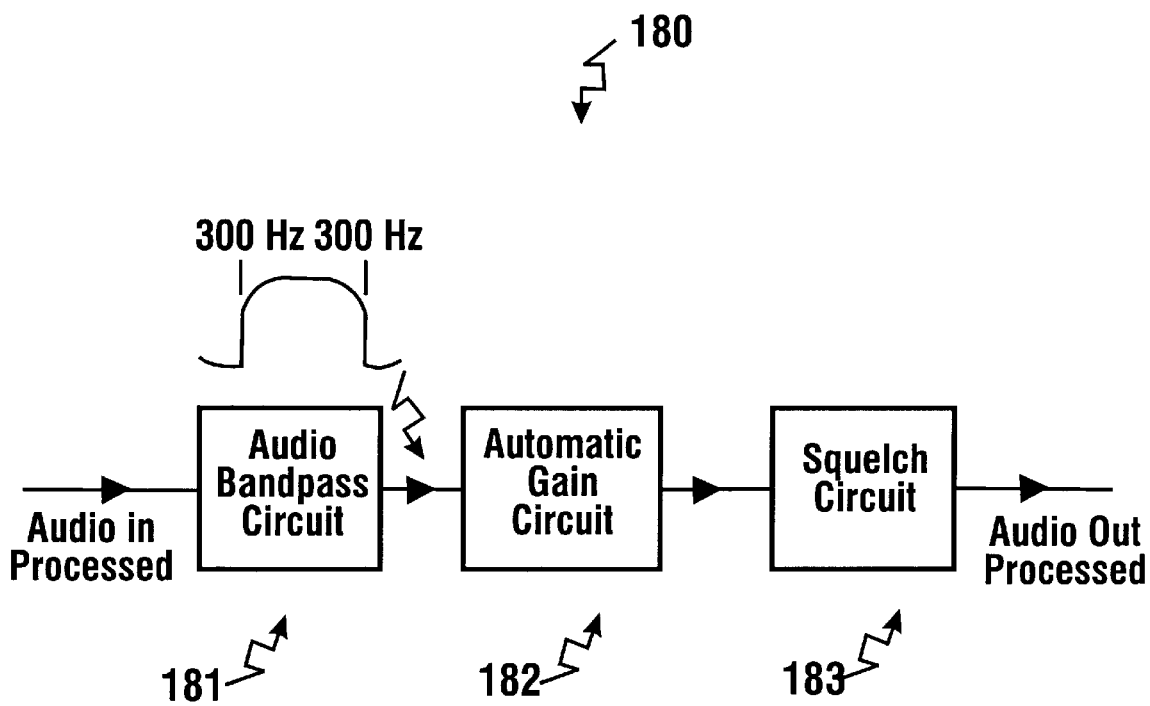
FIG. 21 is a schematic view of circuitry for filtering audio signals from audio-video monitoring units to reduce road and wind noise.

These desirable features are accomplished by filtering the audio signals in the manner shown schematically with regard to FIG. 21. Audio signals are processed based on frequency and amplitude characteristics. Various analog high/low bandpass and band reject filters are used to eliminate undesirable sounds while enhancing desired frequencies. The sounds to be attenuated and enhanced may be varied depending on the location and purpose of the audio-video transmission module.

Digital signal processing techniques may also be used. A digital audio signal processing circuit, generally indicated 180 is shown in FIG. 21. Audio signals are first converted from analog to digital signals in an A/D converter (not shown) in the monitoring unit 150. In the embodiment shown in FIG. 21 voice detection is desired and bandpass circuit 181 serves to bandpass frequencies in the 300–3000 Hz range. Bandpass circuit 181 attenuates other frequencies.

An automatic gain circuit 182 operates to increase gain for low level signals so as to make them more audible. Likewise circuit 182 operates to reduce gain in response to high energy signals. This avoids passing overly loud signals. A squelch circuit 183 is used to selectively establish a threshold level of audio sound that is reproduced. The squelch circuit is selectively adjustable by the operator.

Figure 7:
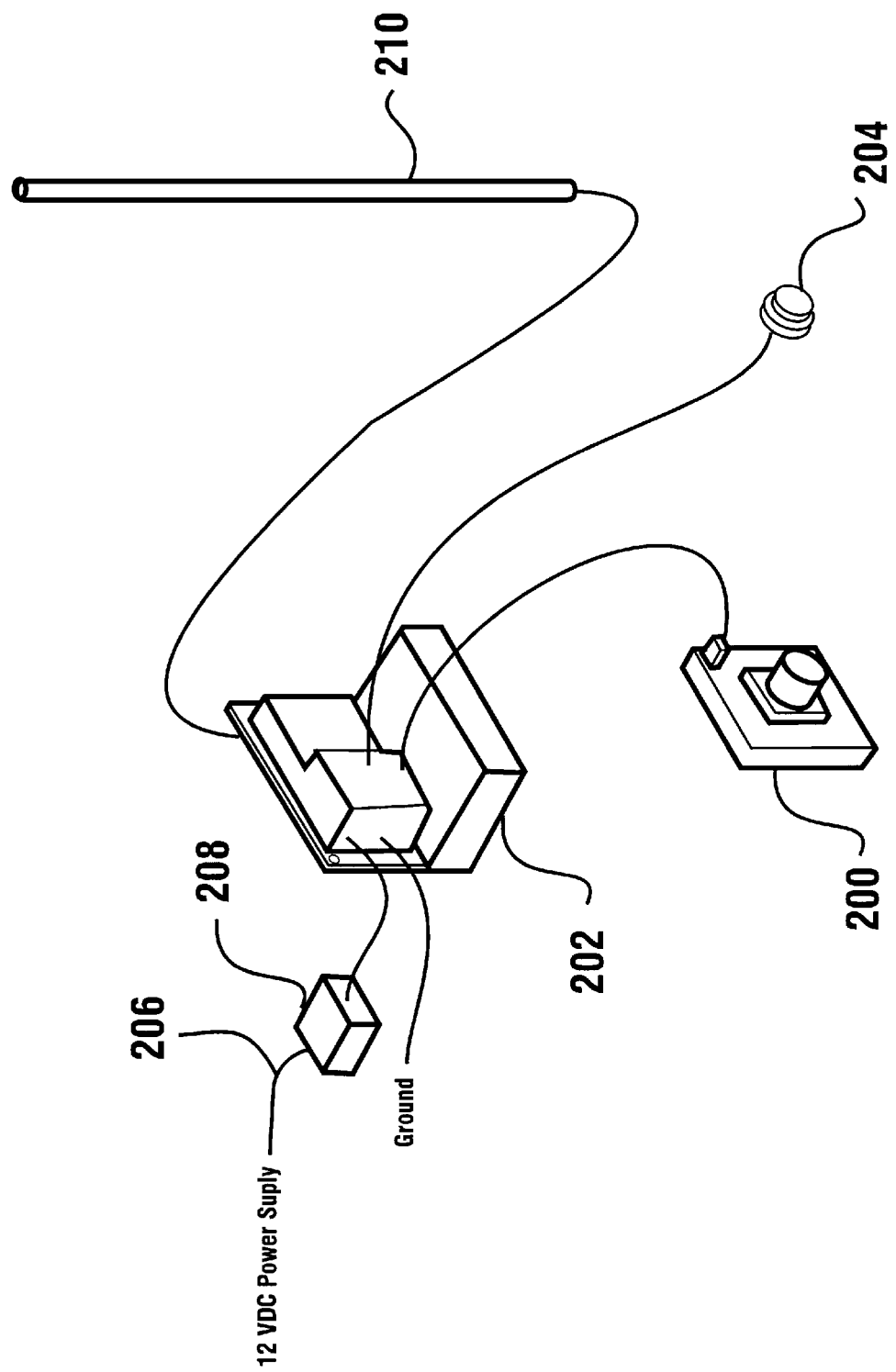
FIG. 7 is a schematic view of the major components of a first embodiment of the audio-video transmission module.

An example of the components that would make up an audio-video transmission module is shown schematically in FIG. 7. The components include a miniature video camera 200 that is connected to a radio frequency wireless transmitter 202. The transmission module also includes a microphone 204 that is similarly connected to the transmitter. The transmitter in the embodiment shown is powered on a line 206 from the DC power source of the vehicle. As shown in this embodiment, a decoder switch 208 is used for turning the transmitter on and off. Of course, the decoder switch 208 is only used in embodiments of the invention like embodiment 40 previously discussed in which the transmission modules transmit on the same frequency. In other embodiments where transmission modules transmit on different frequencies, decoder switch 208 is not required. Of course the transmitter is grounded to the vehicle as shown to enable the transmitter to both obtain power and to avoid interference and inconsistent signals. The transmission module also includes an antenna 210 for transmitting the signals.

In a preferred form of the invention, the miniature video camera is of a type that is suitable for use in low light as well as severe brightness conditions. The preferred form of the mini-video camera is an Ultrack CCTV systems type UL-BC460/P black and white board camera. It has a ⅓ inch CCD image sensor, EIA(NTSC) format, 380 horizontal line scan with 3.6 mm pinhole lens. The transmitter carrier frequently is in the 900 to 930 MHZ range. The unit operates on 12 VDC with 3 watts input power. Output power is less than 0.5 mW (−3 dBm). Radiated power is less than 50 mV/M at 3.3 yards with monipole omni directional antenna. Operating within limits requires no regulatory approvals or permits.

Figure 22:
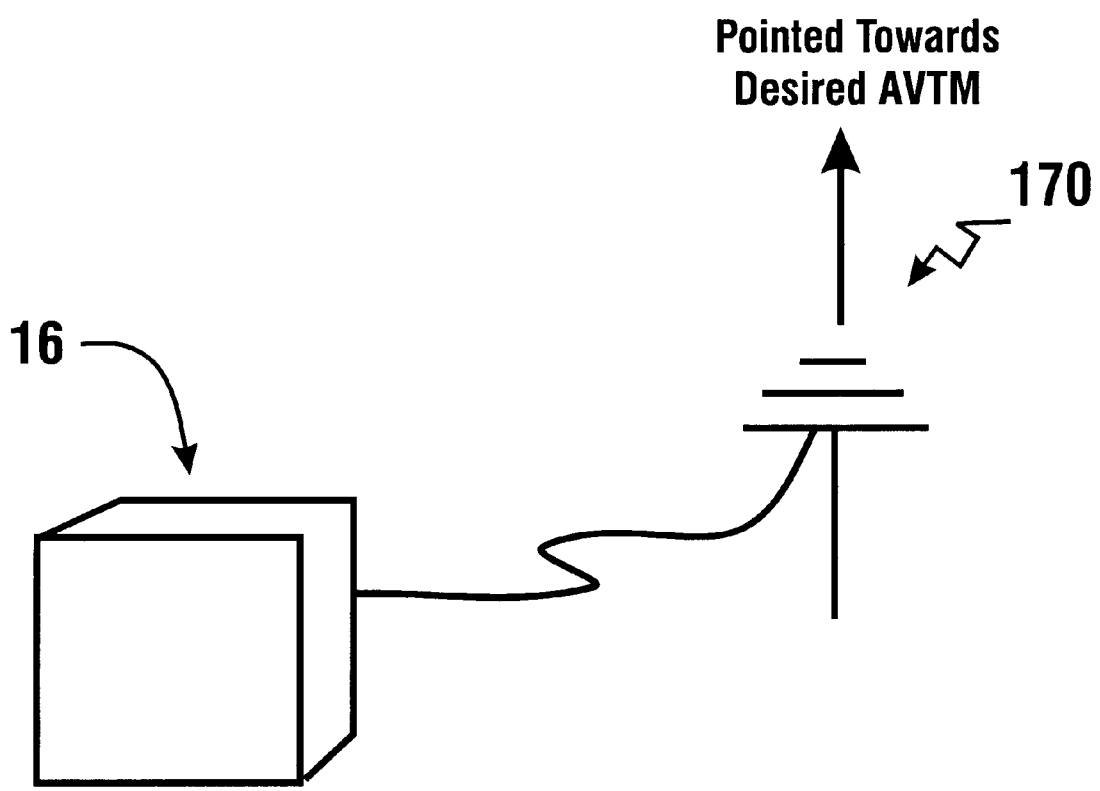
FIG. 22 is a schematic view of a directional antenna system to reduce receipt of video and avoid signals from unwanted sources.

Two approaches may be used to avoid receipt of signals from nearby potentially interfering sources. One approach includes the use of directional antennas that is shown schematically in FIG. 22. Antennas such as YAGI-UDA, Log Periodic or Parabolic Gain and directive antennas may be used. Such directional antennas can maximize desired signal strength while avoiding receipt of undesirable signals.

An alternative approach is the use of frequency changing. Each transmitter in an audio-video transmission module is encoded on the audio or video source with a unique signal signature that is not audible or visible through the monitoring unit. This unique signal signature is correlated to a unique frequency of transmission. In the receiver the circuitry correlates the signal signature to the frequency of reception. The receiver scans radio frequencies for a signal, but the receiver locks on a signal only if the frequency and signal signature correspond to the module desired. The scanning operation is not detectable by an operator. This approach enables rejection of signals from nearby sources such as similar transmitters on other vehicles. The approach enables interference rejection capabilities mathematically related to the number of frequency and signal signature combinations used.

Figure 8:
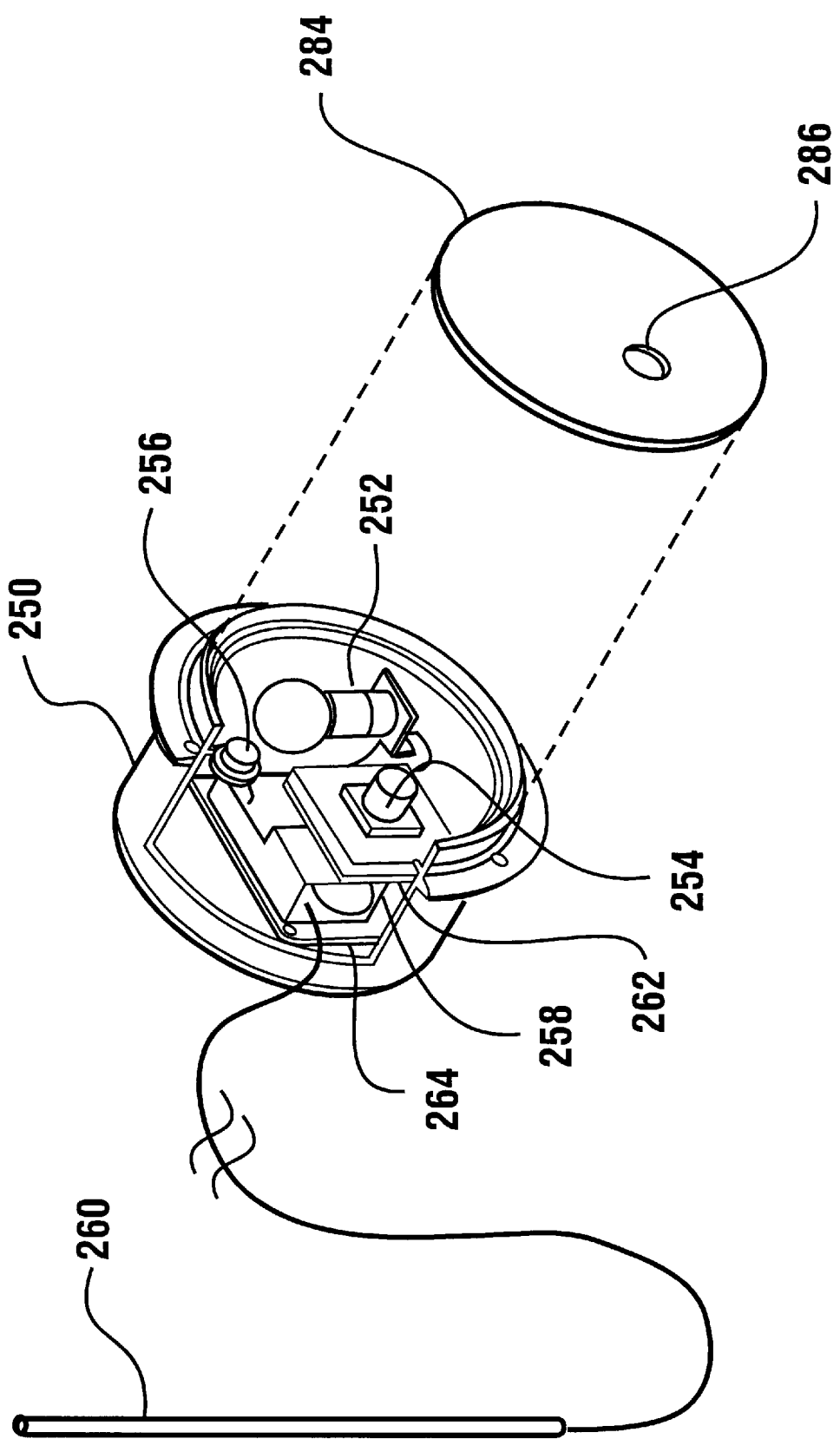
FIG. 8 is an isometric partially exploded view of a first embodiment of an enclosure for an audio-video transmission module combined with a tail light for a motor vehicle.

A first embodiment of a transmission module enclosed within a tail light housing generally designated 250 is generally shown in FIG. 8. The tail light housing encloses a two-filament bulb 252 of the conventional 12-volt type. As previously discussed, the system for powering bulb 252 may involve switching within the vehicle to ground the line to the bulb to turn it on, or alternatively, to deliver power thereto. The transmission module may be supplied continuous power from the vehicle electrical system or it may have re-chargeable battery power when electrical power from the vehicle electrical system is not continuously provided. The audio-video transmission module includes a miniature video camera 254 of the type previously described as well as a microphone 256. The camera and microphone are electrically connected to a transmitter 258 that transmits a radio signal through an external antenna 260.

Electronic components are mounted in the housing to minimize the potential damage due to shock and vibration. This is achieved by mounting the transmitter and the video camera on a pad of shock absorbent material 262 that is a resilient material. In the preferred embodiment the shock absorber is a patented polymer sold under the trademark SORBOTHANE®.

The transmission unit incorporated into the tail light enclosure further includes an environmental control system generally designated 264. Control system 264 provides heating and cooling to the housing. It also provides a heat sink through the taillight housing 250 to the frame of the vehicle or other support structure.

Figure 23:
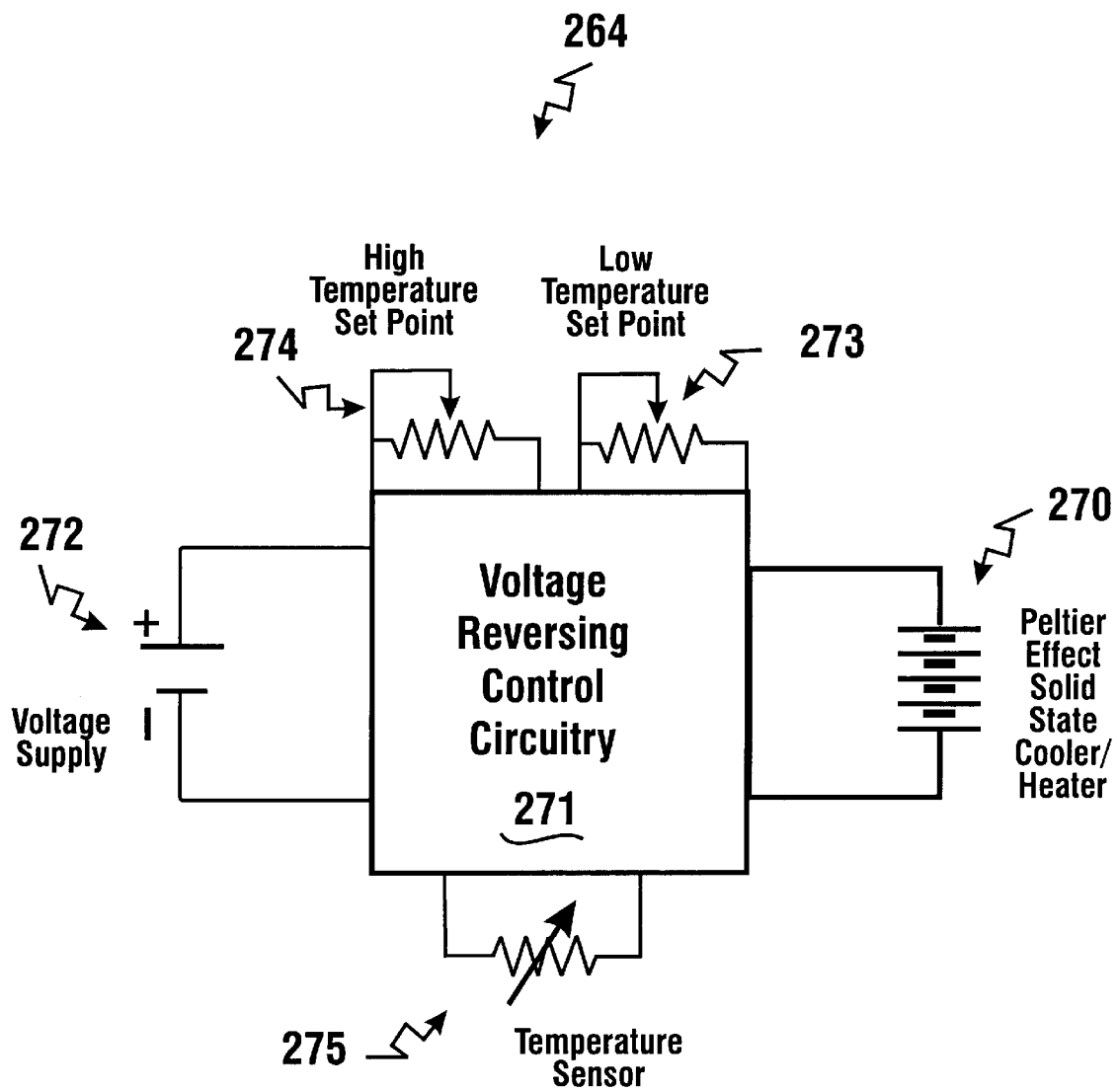
FIG. 23 is a schematic view of a first embodiment of an environmental control system for the interior area of an audio-video transmission module.

An environmental control circuit is shown in FIG. 23. A Peltier Effect solid state heater/cooler 270 is included in the system. The polarity of the applied voltage determines if it operates in the heating or cooling mode. Voltage reversing and control circuitry 271 is powered by a power supply 272, which is preferably the vehicle battery, re-chargeable battery or other power source.

A settable high temperature resistor 274 is used to set the high temperature set point. A settable low temperature resistor 273 is used to set the low temperature set point. A temperature sensor 275 senses the temperature and works in connection with circuitry 271 and resistors 273, 274 to control the polarity and power delivered to heater/cooler 271 to keep the housing within the desired temperature limits.

Figure 24:
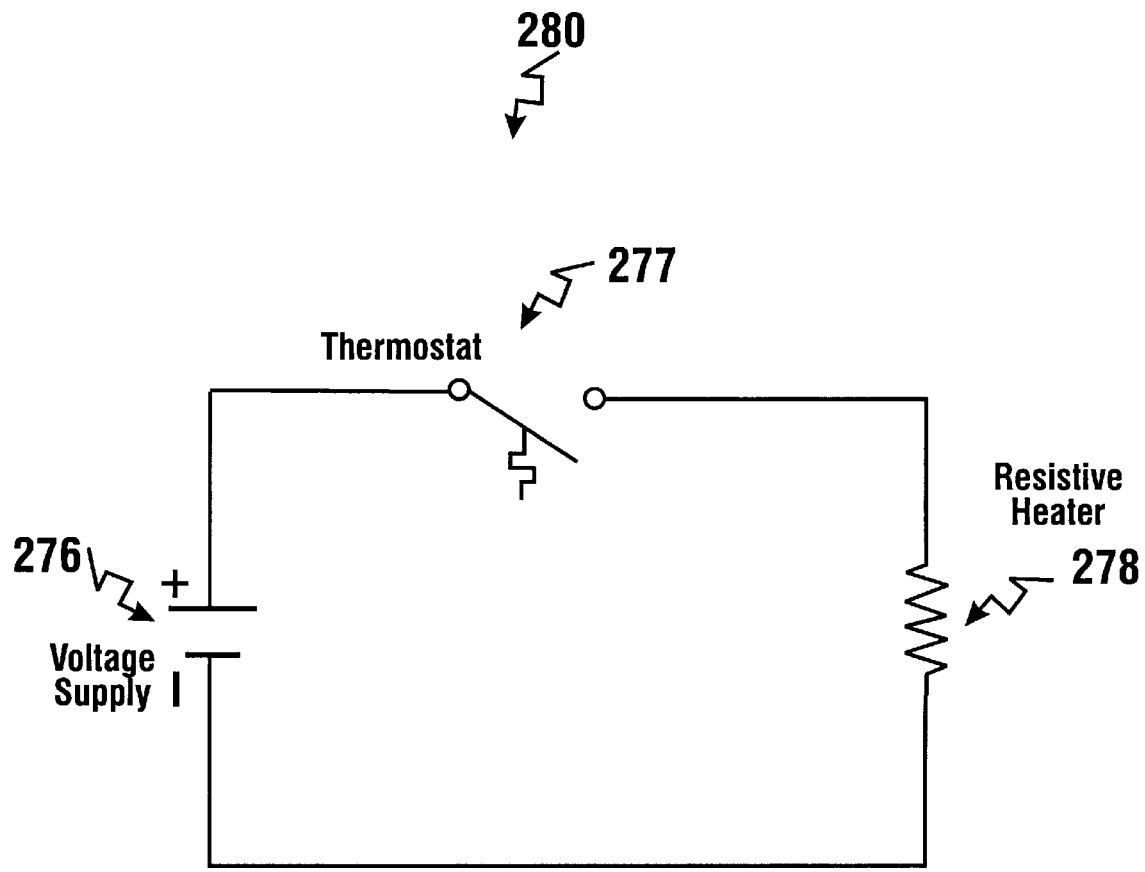
FIG. 24 is a schematic view of an alternative embodiment of an environmental control system for the interior area of an audio-video transmission module.

Alternatively, housing 250 may include a heater circuit 280 as shown in FIG. 24. Heater 280 maintains the interior of the housing at an elevated temperature in excessively cold conditions. A voltage supply 276 supplies the energy for the heater. The voltage supply 276 is typically the vehicle battery or other electrical power source. A resistance heater 278 is connected in series with a thermostatic switch 277. Whenever the temperature in the housing falls below a desired level, the thermostatic switch closes to cause more heat to be generated. Once at the desired temperature thermostatic switch 277 again opens to stop the heating.

For control of humidity, replaceable bags of desiccant material are placed in the housing. A suitable desiccant material may include silica gel encapsulated in a porous envelope such as polyester.

The assembly includes a lens 284. Lens 284 may be colored red or amber as required for the particular type of tail light or other assembly. The lens 284 may have a ribbed or diamond shaped surface throughout most of its surface area. However lens 284 has a view port 286 in which the surface of the lens is generally smooth on both sides. View port 286 is installed in aligned relation with the aperture of the camera 254. As a result, the camera is enabled to view through the view port. In the preferred embodiment the view port may be tinted in a manner similar to the lens so as to minimize its conspicuity. Of course in other embodiments the view port may be clear.

To ensure an airtight environmental enclosure the lens 284 is sealed to the housing 250 using a resilient gasket material as well as a suitable non fogging sealant. This ensures that the housing is highly resistant to penetration by moisture. Further in embodiments of the invention, the view port 286 may be covered with a removable or multi layer plastic film that has self adhesive properties. In this manner in the event that through wiping or abrasion the outer film becomes scratched or marred, the outer film layer may be peeled away to expose a new surface. This results in the viewing port again providing a clear picture. Further when all of the layers of plastic have been removed an additional multi layer stack may be applied. Of course alternative means for cleaning the view port may be provided including the use of wipers, sprays or other cleaners in the manner hereafter described.

Figure 9:
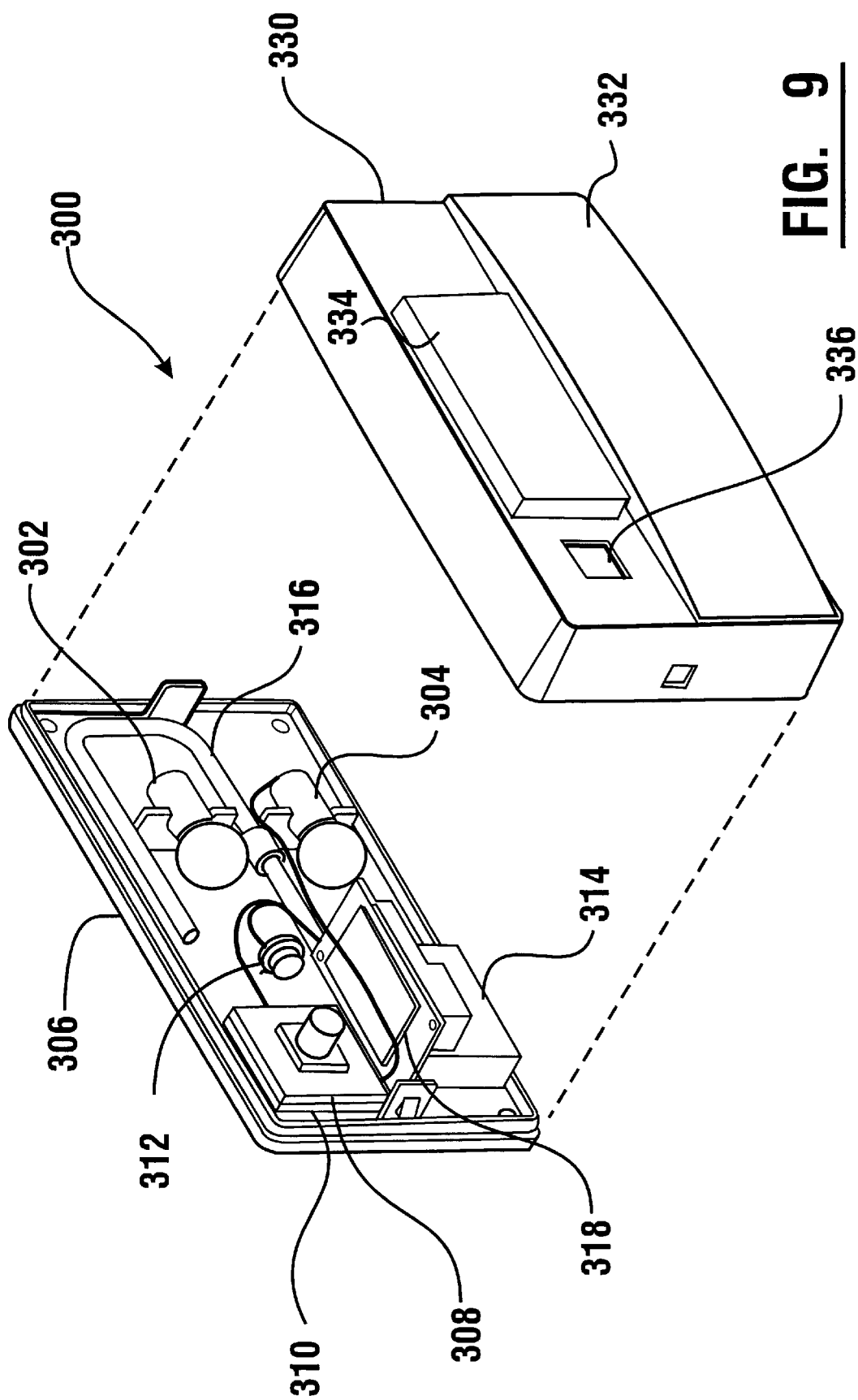
FIG. 9 is a schematic view of a second embodiment of an audio-video transmission module enclosure combined with the tail light for a recreational vehicle.

A second embodiment of the invention shown in conjunction with a recreational vehicle type tail light generally indicated 300 is shown in FIG. 9. The transmission module is incorporated with the tail light components including a back up light bulb 302 and a tail and brake light bulb 304. The bulbs and the components of the transmission module are mounted on a base 306.

A miniature camera module 308 is supported on a shock resistant mount 310 in a manner similar to that previously described. A microphone 312 is also supported on the base. The microphone and camera are connected to a transmitter 314. The transmitter is connected to an unshaped antenna 316 which is configured to be fully within the housing. An advantage of having the antenna within the housing is that it is less conspicuous and also more tamper resistant.

The housing further includes environmental control features including a heating unit or heating/cooling unit generally indicated 318. The heater or heater cooler works in the manner previously described with reference to FIGS. 23 and/or 24.

Assembly 300 also includes a lens 330. Lens 330 has a lower portion 332 that in the preferred embodiment may serve as a tail and stop light combination. Lens 330 also has an upper portion 334 that in one preferred form of the invention is a back up light. In another embodiment, the upper portion may be an amber type turn signal or other type of flasher or warning light. Lens 330 also includes a view port 336 that is aligned with the aperture of camera 308. View port 336 may be clear or in the alternative may be colored to conform with the surrounding portion of the lens so as to minimize the possibility of detection. As with the other forms of the invention it is important to have a water tight seal between the lens and the base so as to avoid the introduction of water and other contaminants that may affect the operation of the components of the transmission units.

A third embodiment of an audio-video transmission module and housing is shown with regard to FIGS. 10 and 11. The housing generally indicated 360, is shown in FIG. 10. The housing has a generally bullet shape to provide improved aerodynamic properties as well as to minimize fouling of the lens. Housing 360 includes a bullet shaped nose portion 362 as well as an undercut ring portion 364. Ring portion 364 has a central tapered opening 366 that extends to a lens 368 as shown in FIG. 11. The nose portion 362 includes a cylindrical portion 370. Cylindrical portion 370 houses an antenna 372 as shown in FIG. 11.

Housing 360 is of clam shell construction having a first housing half 373 and a mating second housing half 374. The housing encloses a camera 376 and a microphone 378. The camera and microphone are mounted on a pad of shock isolating material 380. The microphone and camera are connected to a transmitter 382 that transmits the radio signals from the microphone and camera through antenna 372.

The transmission module further includes an environmental control package. The environmental control package has a heater/cooler generally designated 384. The heater/cooler works generally in the manner previously described to maintain the interior of the housing at a suitable temperature for the operation of the electronics when the environment surrounding the housing becomes unduly hot or cold.

Figure 14:
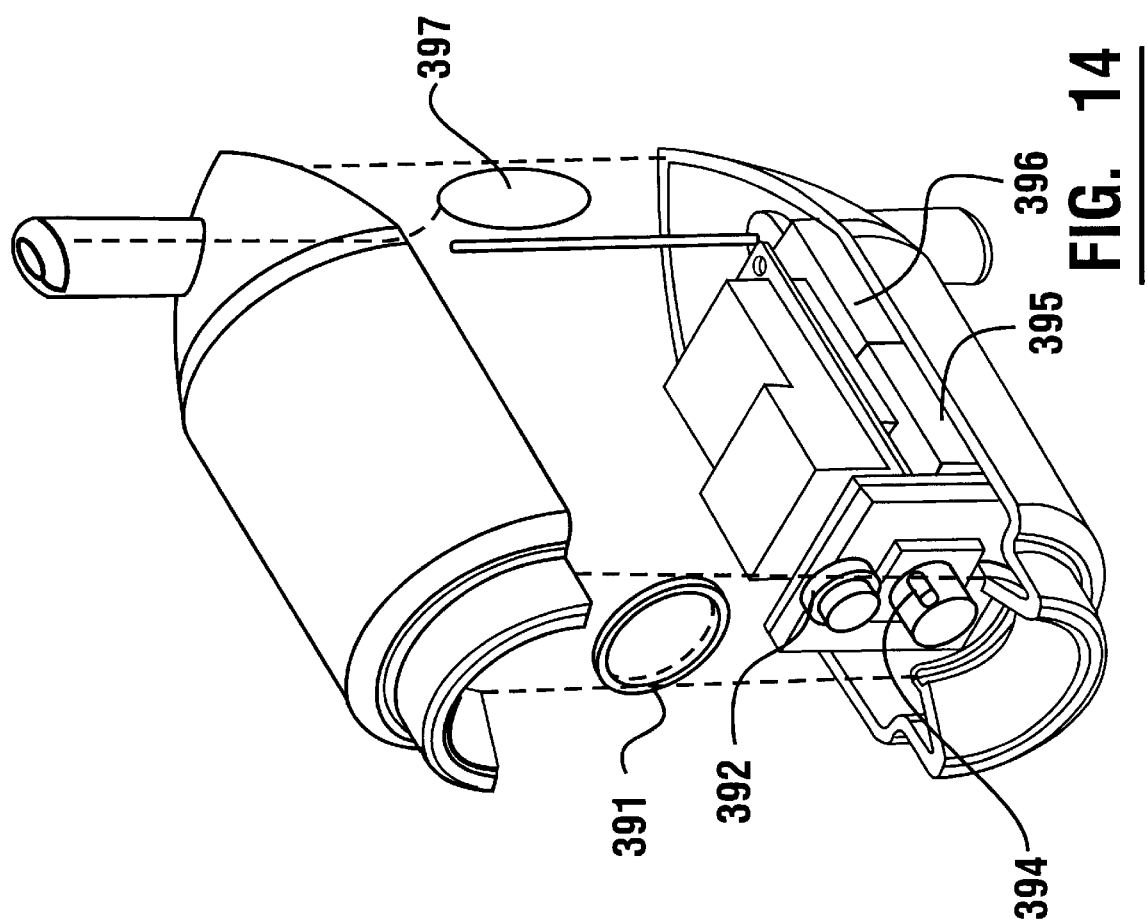
FIG. 14 is an exploded isometric view of the audio video transmission module shown in FIG. 13.
Figure 13:
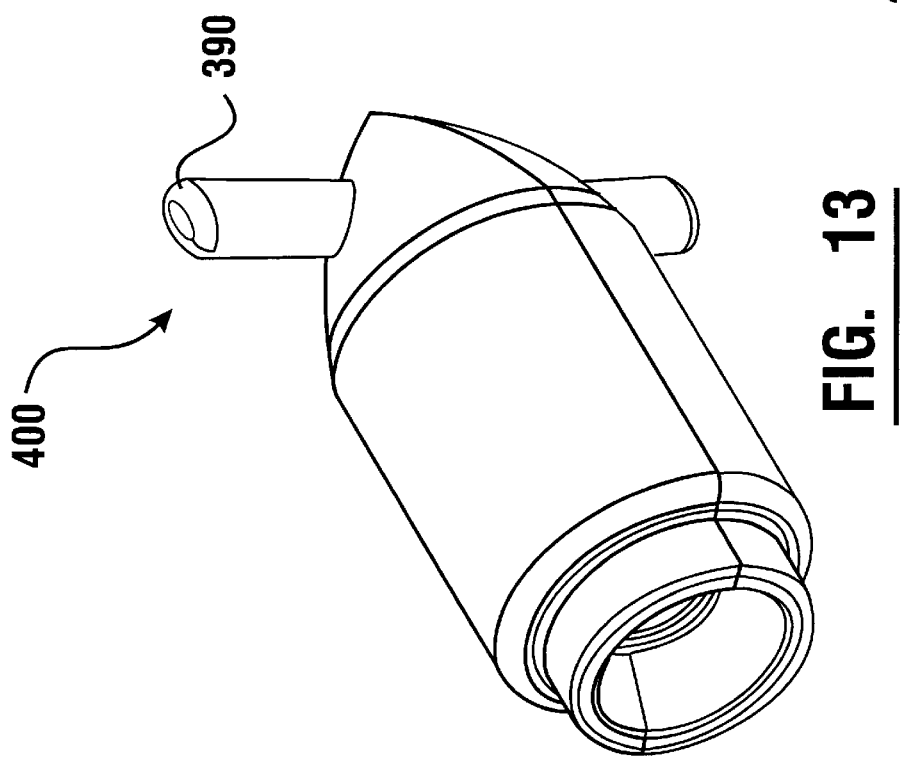
FIG. 13 is an isometric view of a fourth embodiment of an audio-video transmission module.

A fourth embodiment of the audio-video transmission module 400 is shown in FIGS. 13 and 14. This alternative embodiment is similar to that shown in FIGS. 10 and 11 except as hereinafter described.

The module 400 includes a removable cap 390 at the top end of the antenna enclosure. The cap has attached thereto a bag or other enclosure housing desiccant material 397, such as silica gel. The desiccant material may be periodically replaced as required to maintain a suitable low humidity environment in the housing.

The module 400 further has a lens 391 that is comprised of a polycarbonate material. Such material is a good transmitter of sound. The lens enables sound to reach the interior of the housing wherein it is detected by the microphone 392.

Figure 25:
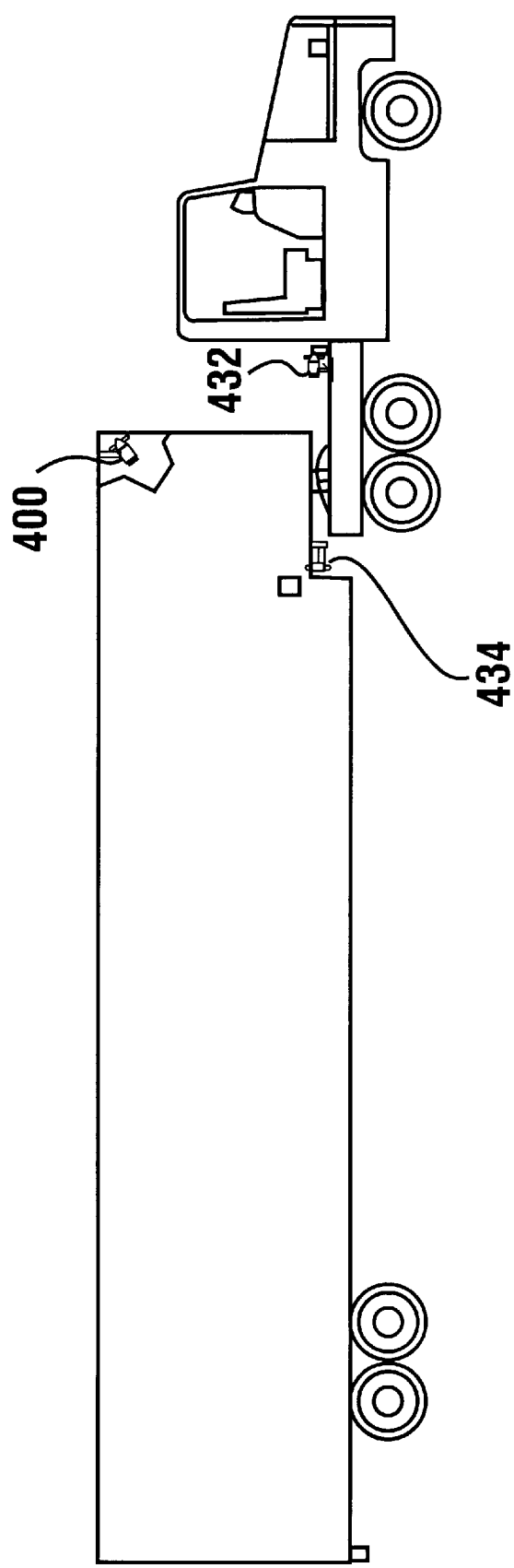
FIG. 25 is a partially sectioned side view of a semi-tractor and semi-trailer incorporating audio-video transmission modules for facilitating coupling of the tractor and the trailer and for monitoring activity in the interior of the trailer.

Module 400 may be specifically adapted for use in detecting intrusion into the interior of a semi-trailer. For example, module 400 may be positioned as shown in FIG. 25. In such applications microphone 392 is connected with a sound detection circuit. The sound detection circuit is operable to cause the module 400 to come on in the event that sound exceeding a preset level is sensed. Such sound may be indicative of someone breaking into the trailer.

Module 400 further includes a motion detector 394. The motion detector is preferably a Part No. 8935 made by Westek of San Diego, Calif., or a similar detector. As with the case of the sound detector, triggering of the motion detector causes the module to turn on. Alternatively, the module may incorporate smoke, flame or temperature detectors to cause it to transmit signals depending on the application in which it is used.

The audio-video transmission module is preferably operated such that when it comes on to indicate an alarm condition its signals take precedence over other modules. This is done by appropriate programming of the monitoring unit, based on the type of system in which the module is used. Alternatively, module 400 positioned in the interior of a trailer that is being stored in a terminal or other facility may transmit to receivers operated by security forces. The use of the keyed frequencies previously discussed to avoid interference may be used in such applications to quickly identify the trailer being broken into or which is transmitting another alarm condition.

Module 400 further includes an environmental control module 396. This is preferably similar to the heater/cooler previously described. It also includes a rechargeable battery 395. Battery 395 is used to provide power for the module when power from the vehicle is not available. Battery 395 is preferably of the nickel-cadmium or the nickel metal hydride types.

Figure 15:
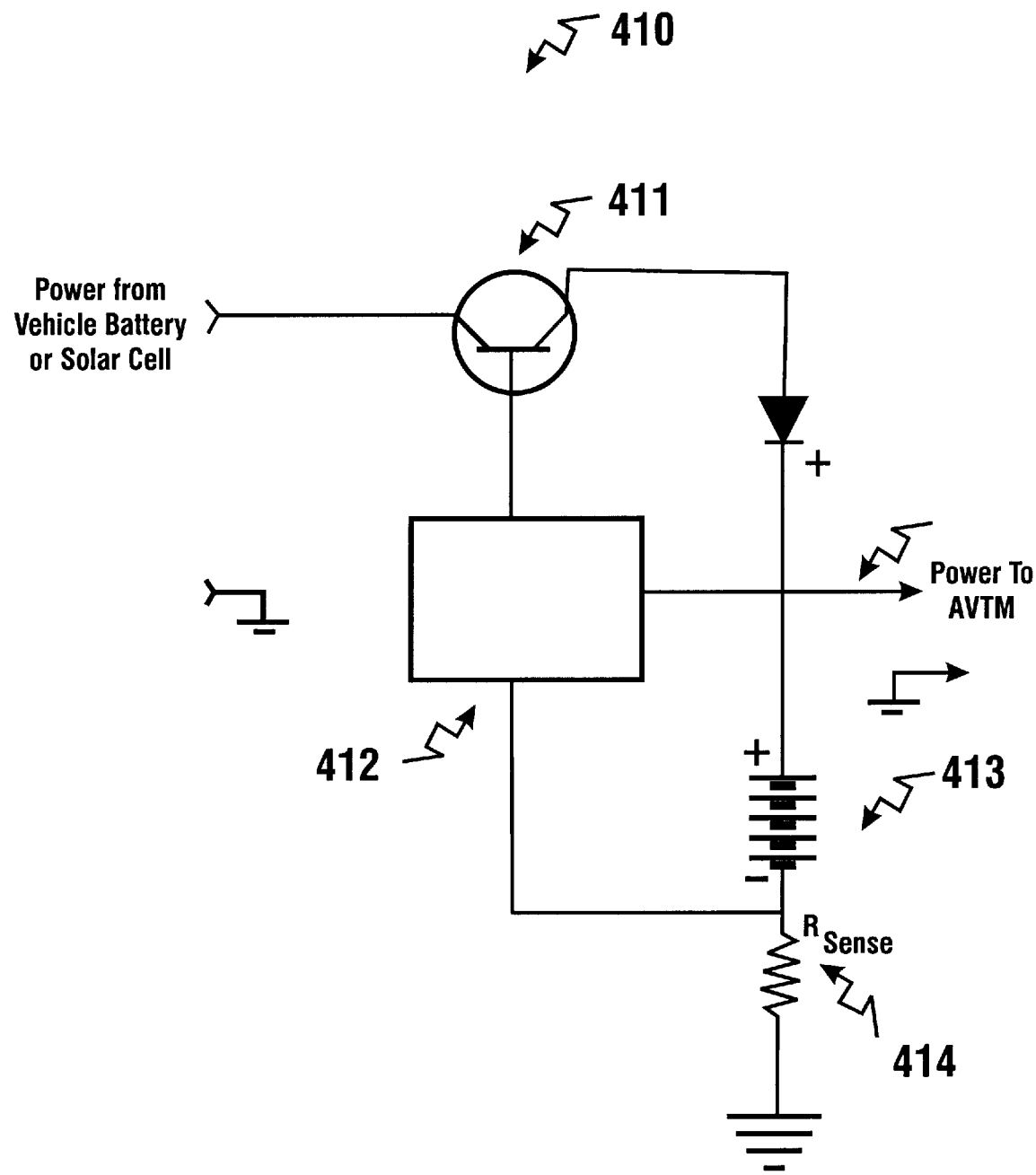
FIG. 15 is a schematic view of a power system for audio-video transmission module.

A recharging system generally indicated 410 for recharging battery 395 is shown in FIG. 15. The system is designed to power the audio-video transmission module from the vehicle electrical system when power is available and simultaneously charge the battery. When power is no longer available from the vehicle, the module runs off the battery.

In recharging circuit 410 a rechargeable battery 413 is included. Current from the vehicle is passed to the circuit through a solid state current controller 411. A control circuit 412 that in the preferred form of the invention is a Model Max #713 manufactured by Maxim, compares battery voltage to available voltage. An Rsense resistor 414 is used to compare battery voltage to available power. If power from the main vehicle system is disconnected, the battery immediately takes over. When power from the vehicle is again available, power from the vehicle is again used to operate the module and to charge the battery.

The charging circuit 410 may have connected thereto other sources of electrical power other than the vehicle electrical system. For example, power may be delivered to the current controller 411 from the electrical system of a refrigeration unit of a semi-trailer. This will enable the unit to be recharged periodically by the refrigeration unit when the trailer is disconnected from the semi-tractor. Alternatively, solar panels or other sources of power may be used. Such approaches provide greater assurance that the audio-video transmission module 400 when used as a security device in a trailer will be operable for as long as possible when disconnected from a tractor.

The audio video transmission module 400 may be fitted with a lens cleaning system. This is desirable when the module is installed on the exterior of a vehicle. The lens cleaning system is shown in FIGS. 16 and 17.

The lens cleaning system is generally indicated 402. The system includes an inner ring 409 that is fixed to the housing 360 of module 400. Ring 409 includes a scratch resistant polycarbonate lens cover 430 that protects lens 391. Inner ring 409 has rotatably supported thereon an outer ring 420. The outer ring is held in relative lateral position on the inner ring by retainers shown schematically as 422.

A motor 423 is rotatable under control of a motor controller 424. Motor 423 drives a gear 421. Gear 421 is engaged with gear teeth that extend about the inside diameter of outer ring 420. This enables motor 423 to rotate the outer ring 420.

A wiper 429 extends across lens cover 430. Wiper 429 is attached at one end to a rotatable pivot 425 on the fixed inner ring. The opposed end of wiper 429 includes a pin 427 that rides in a slot 426 in the outer ring. As shown in FIG. 16 motor 423 may rotate outer ring 420 to enable wiper 429 to clean an area in front of the lens. This enables effective viewing in wet or dirty conditions.

The lens cleaning system further preferably includes a spray cleaner to facilitate cleaning by wiper 429. The spray system includes a reservoir 404 for holding a supply of windshield washer or comparable fluid. The reservoir supplies fluid to a pump 405. Pump 405 is operated by a motor 406. Motor 406 has an associated controller 407. Pump 405 supplies fluid to a conduit 408 that deposits the fluid on the lens cover 430. The spray cleaner can be used concurrently with the wiper to facilitate cleaning of the lens cover. The reservoir and pump can be a separate module from the housing 360 or may be incorporated into the housing. Further, the outer ring and pump may be operated from a single motor in some embodiments. This may be useful where modules are positioned so as to not require frequent cleaning in rainy conditions.

Figure 31:
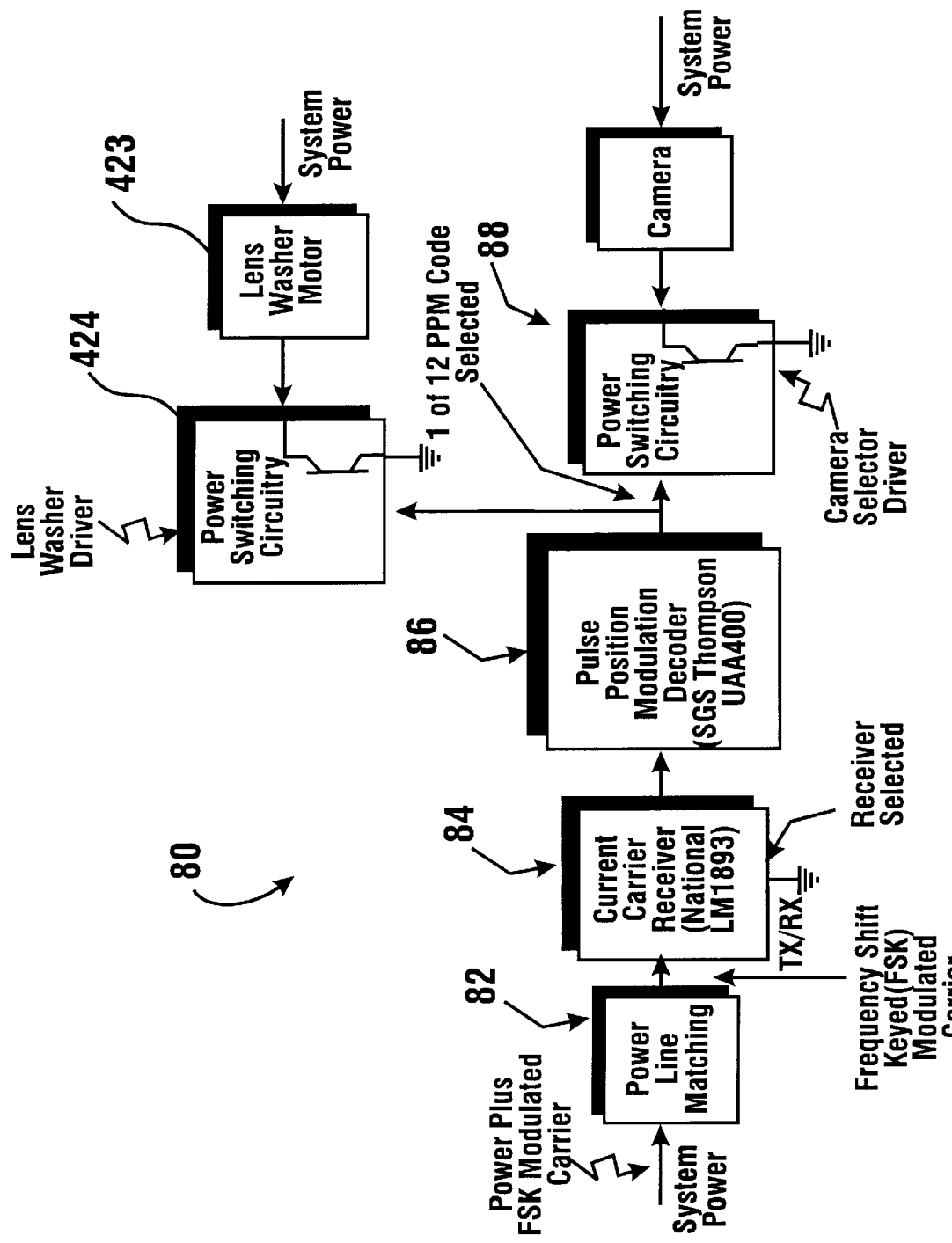
FIG. 31 is an alternative form of decoder circuitry for use with an audio-video transmission module cleaning system.

The control of motors 423 and 406 is explained with regard to FIG. 31. FIG. 31 is similar to FIG. 6. In the preferred form of the invention, the signals for actuating the cleaning action of the audio-video transmission modules are transmitted on the electrical wiring of the vehicle electrical system in the same manner as those signals that turn the cameras selectively on and off. As a result the lens covers may be selectively wiped and/or sprayed under control of an operator by causing the desired signals to be output to run motors 423 and/or motor 406. A suitable arrangement such as push buttons may be provided adjacent to the monitor to enable the operator to initiate the cleaning actions.

Audio video transmission modules may be used in a plurality of applications. As shown in FIG. 25 a module 432 may be positioned facing rearwardly on a semi-tractor. Such a module may be used during backing to view the relative positions of the components used to connect the semi-tractor to a semi-trailer. It particularly facilitates backing into aligned position with trailers for sleeper cab type units or in other limited visibility conditions.

A forward facing module 434 positioned on the semi-trailer may be used to help in guiding a semi-tractor into position. It also reduces risks of accidents in connecting or disconnecting tractors and trailers. The trailer or tractor may further have a suitable visible target to help align the units when being guided by the audio video transmission modules.

Figure 26:
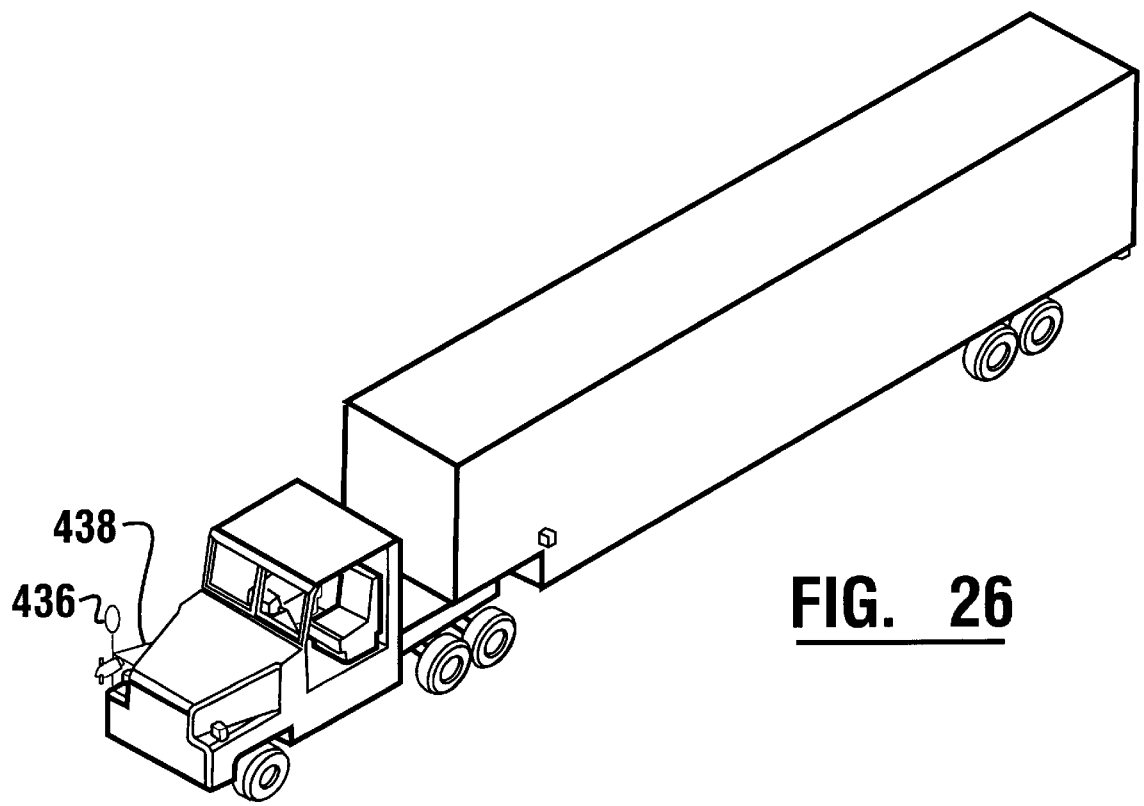
FIG. 26 is an isometric view of a semi-tractor and a semi-trailer shown with an audio-video transmission module positioned for viewing the right side blind spot thereof.
Figure 27:
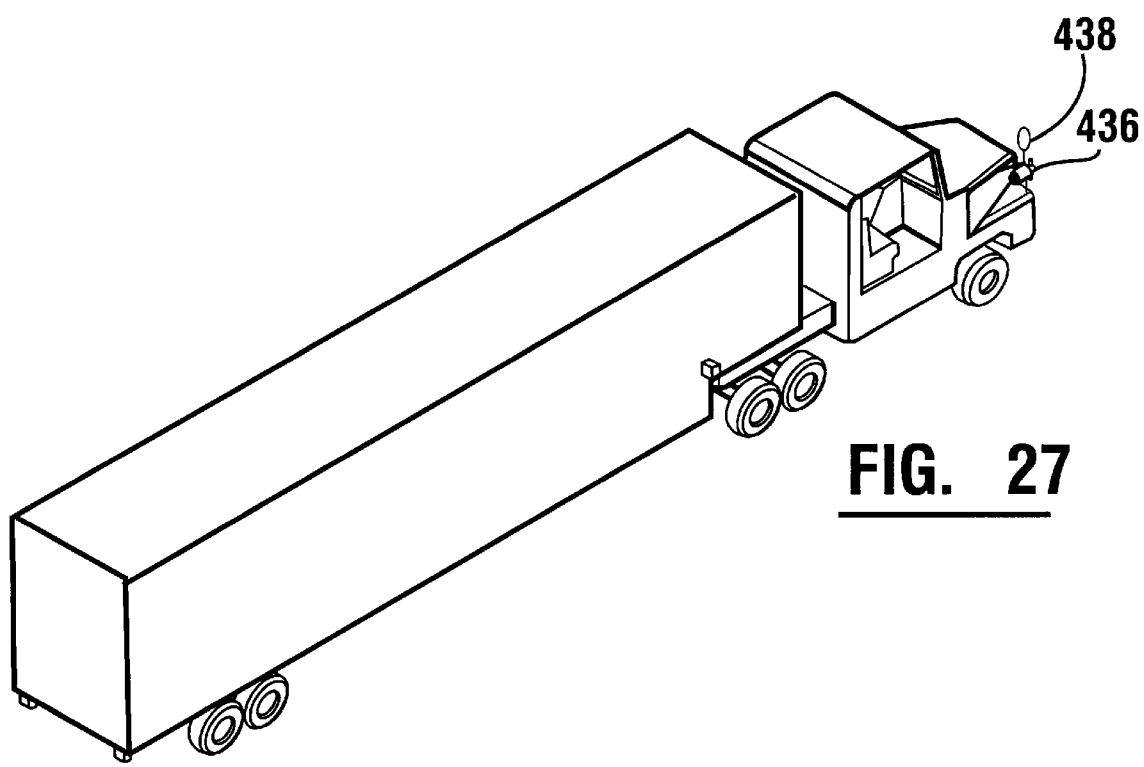
FIG. 27 is an opposite isometric view of the semi-tractor and semi-trailer shown in FIG. 26.

FIGS. 26 and 27 show a semi-tractor and semi-trailer with video-audio transmission module 436 positioned for observation of the right side blind spot. In this embodiment module 436 is mounted on a mast of a mirror bracket 438. This mounting is accomplished using a Model No. 21-397B mounting bracket available from Radio Shack. This mounting provides 360° rotatable adjustability as well as vertical adjustment on the mast of bracket 438.

Modules 436 may be of the types previously discussed which are periodically or selectively cycled to provide video and audio outputs to the operator. Alternatively, or in addition, modules 436 may further include a radar type detector mounted in the housing. The radar detector is preferably aligned with the camera and senses when an obstruction enters the field of view of the camera. Such sensing may be used to turn on the camera, signalling to the operator that there is a vehicle or other obstruction in the blind spot.

Figure 28:
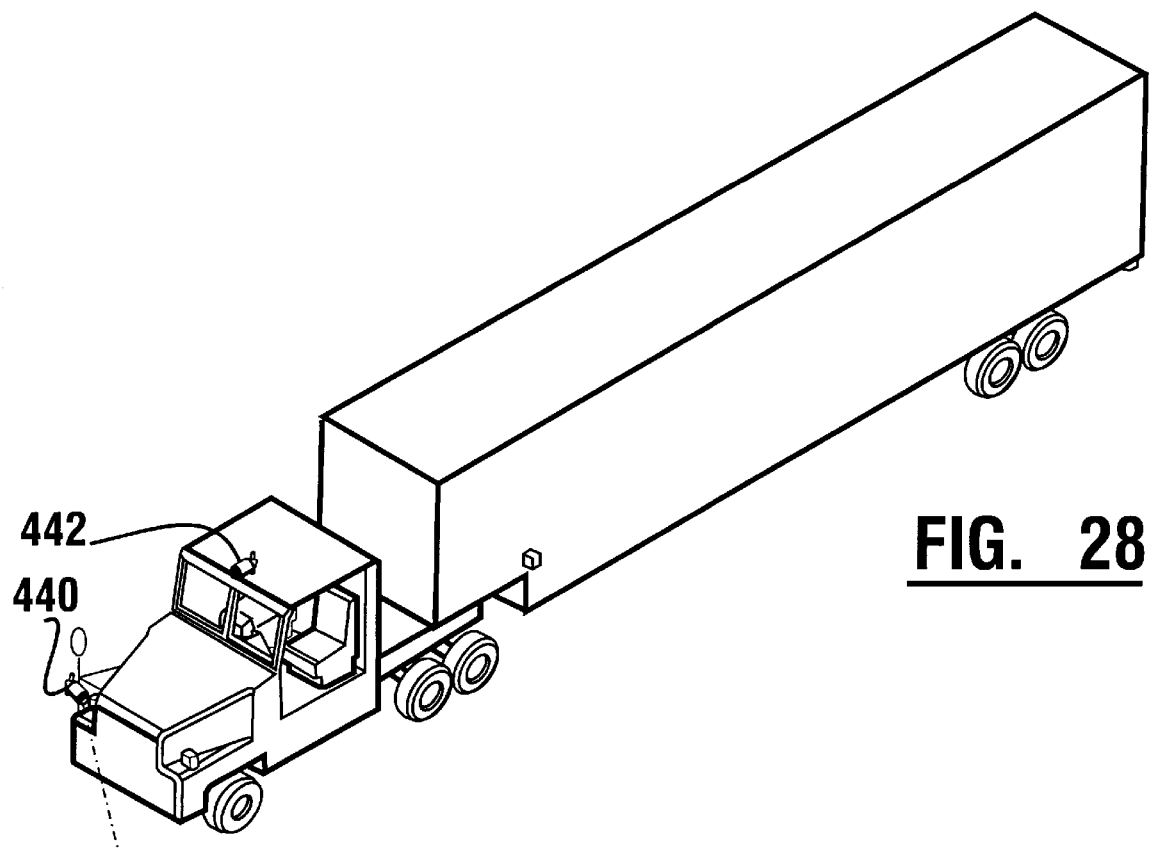
FIG. 28 is an isometric view of a semi-tractor and semi-trailer with audio-video transmission modules positioned to view the front blind spot and to observe low laying objects.
Figure 29:
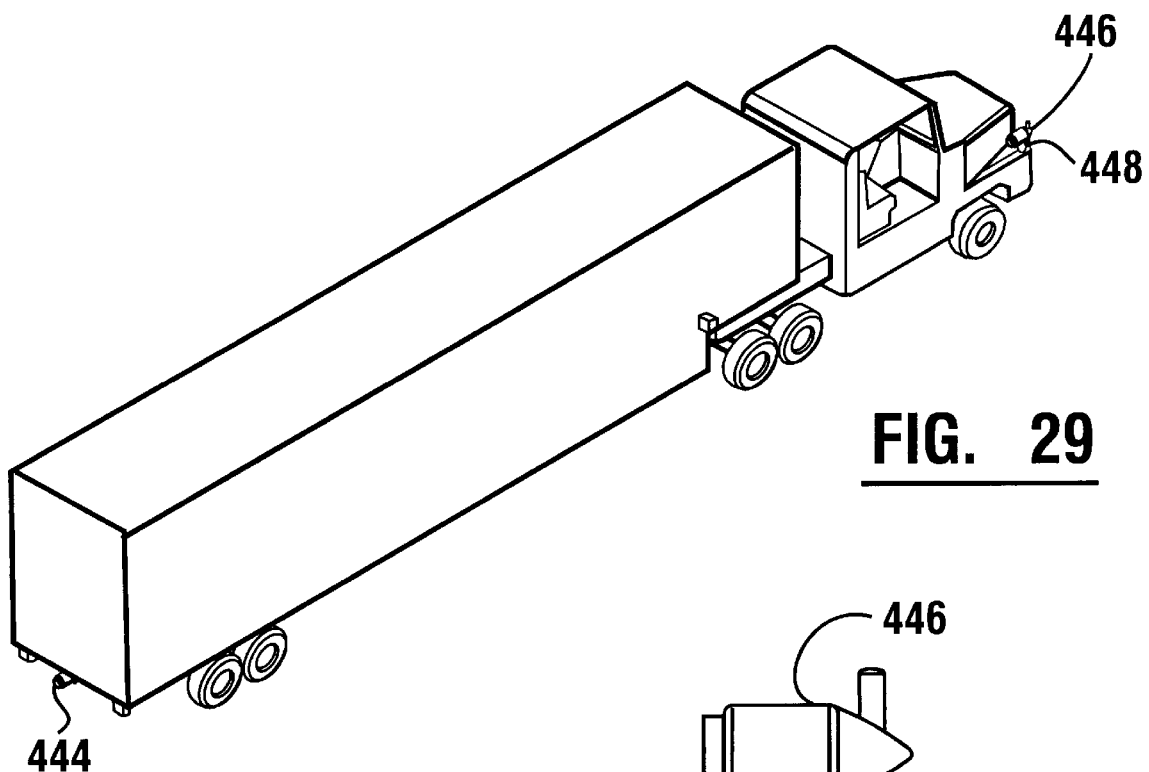
FIG. 29 is an isometric view of a semi-tractor and semi-trailer with audio-video transmission modules positioned to observe the right side blind spot and rear blind spot.
Figure 30:
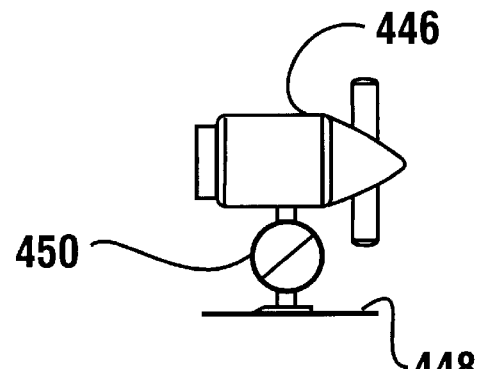
FIG. 30 is a right side view of the audio-video transmission module and bracket supported on the front fender of the semi-tractor shown in FIG. 29.

FIGS. 28 and 29 disclose alternative positions for audio-video transmission modules on a vehicle. FIG. 28 discloses a module 440 that is directed to view the front blind spot. Module 442 is positioned on top of the cab to observe bridges and other low hanging obstructions. Either or both of modules 440, 442 may be equipped with radar type detectors to sense obstructions in the line of camera sight and may be controlled to alert the operator of an obstruction.

FIG. 29 shows an audio-video transmission module 444 mounted to observe a rear blind spot of a semi-trailer. Such mounting may be used in situations where the module components are not incorporated into the tail light housing.

Audio-video transmission module 446 is mounted on the fender surface 448 of the semi-tractor. Module 446 is mounted on a bracket 450 that are both rotationally and angularly adjustable so as to provide a full range of options for positioning the module. Bracket 450 is preferably Catalog No. 21-1115 manufactured by Archer. Of course other bracket types may be used and other positions and applications will be apparent to those having skill in the art from the foregoing description.

Figure 32:
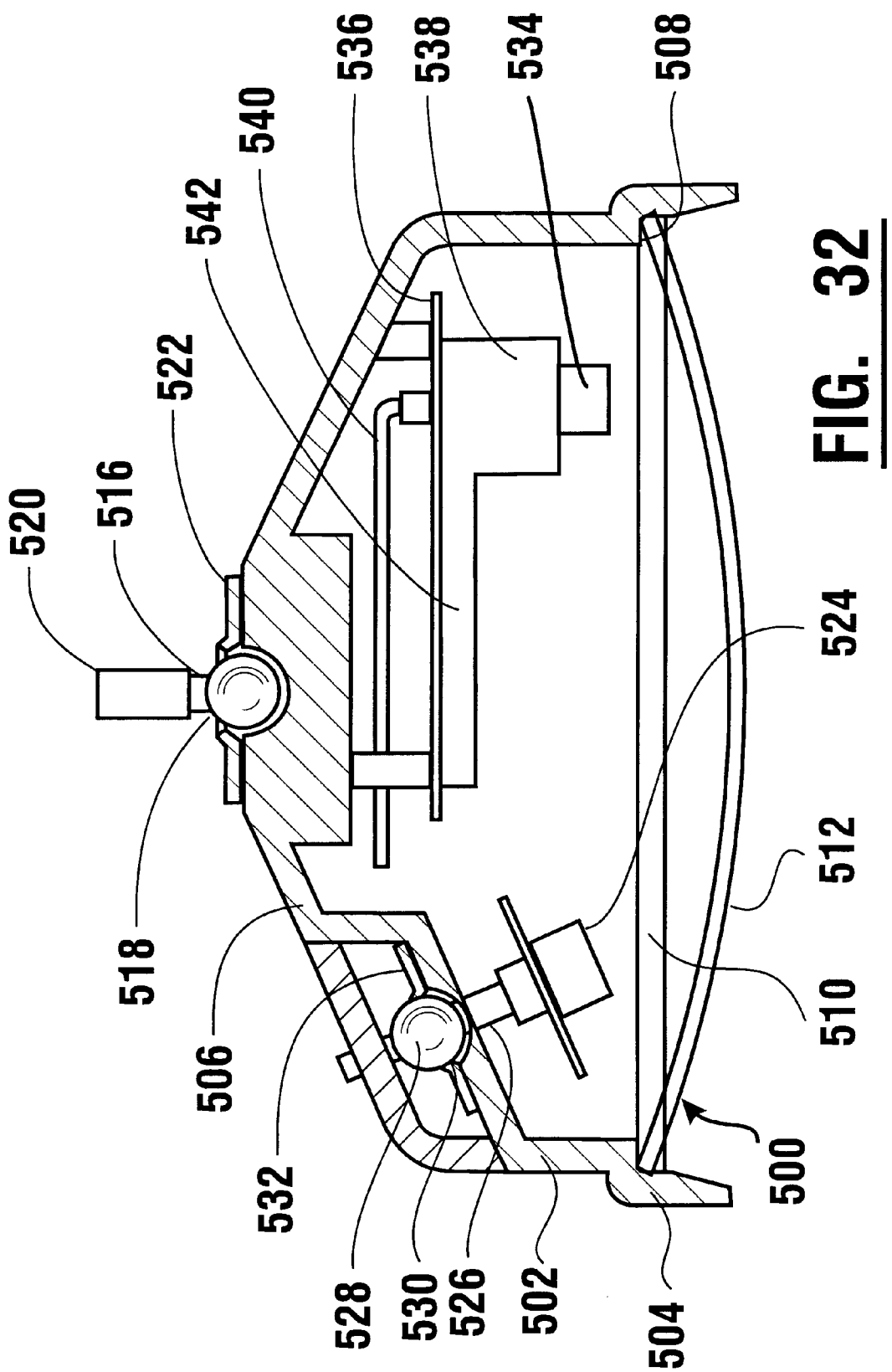
FIG. 32 is a cross sectional view of a fifth embodiment of the audio video transmission module of the present invention.
Figure 33:
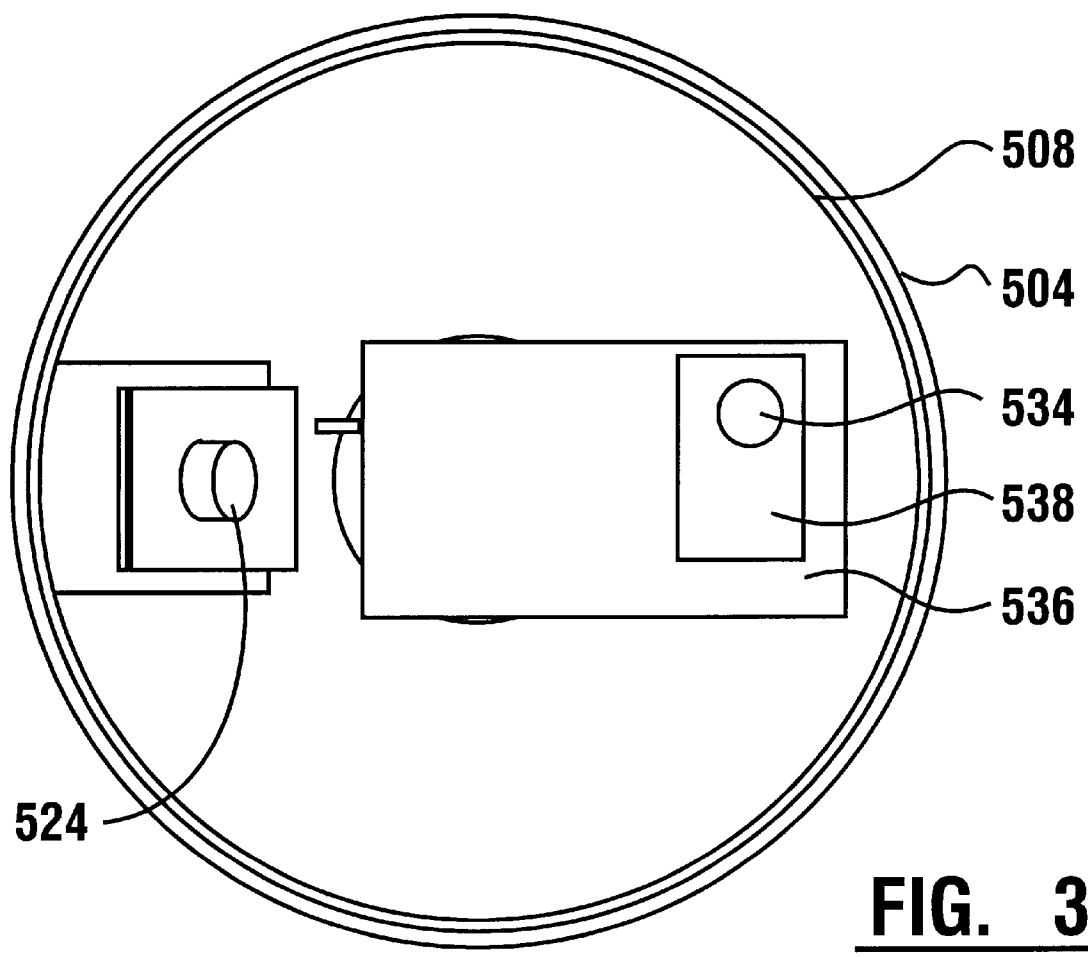
FIG. 33 is a plan cut away view of the fifth embodiment of the audio video transmission module of the present invention.

A fifth embodiment of the audio-video transmission module 500 is shown in FIGS. 32 and 33. This alternative embodiment also functions as a spot mirror as described below.

The module 500 includes a housing 502 which is generally shaped like a truck spot mirror. The module provides a convenient and inconspicuous mounting configuration and also provides an aerodynamic shape.

The housing 500 includes a ring portion 504 and a body portion 506. The ring portion 504 is undercut to provide a ledge 506 that extends the circumference of the ring portion 504. The ledge 508 generally surrounds a tapered opening 510.

The module 500 further includes a lens 512 that is fit against ledge 508 between opening 510. The lens 512 is preferably a one way convex mirror. The convex mirror shape allows the module 500 to function as a conventional spot mirror. The one way functionality of the lens 512 allows light to be transmitted to the audio-video components positioned within the housing. The mirrored lens also prevents the viewing of the internal components from outside the housing.

The body portion 506 includes a semi-spherically shaped groove 514 that is located centrally on the back of the housing 502. The module 500 further includes a stud 516 for attachment of the module 500 to a vehicle mirror bracket located on the vehicle. The stud 516 includes generally spherical first end 518 and a generally cylindrical second end 520. The second end 520 of the stud 516 is adapted for attachment to the vehicle mirror bracket.

The first end 518 of the stud 516 is positioned within the groove 514 in a ball and socket arrangement. This arrangement allows the stud to rotate universally within the groove 514. The first end 518 is retained within the groove 514 by a capture plate 522. The capture plate is secured to the body portion by threaded fasteners that are threadable within corresponding holes within the body portion.

The module 500 further includes a video camera 524 that is connected to a mounting member 526. The mounting member includes a spherical central portion 528 that is positioned within a socket 530 on the housing. The central portion and the socket function as a ball and socket joint that allows for the universal directioning of the video camera 524 within the housing. The position of the video camera is secured by a retaining plate 532 and a plurality of fasteners which are not shown.

The module 500 further includes a microphone 534 that is supported on a pad of shock insulating material 536. The microphone is preferably the same as described with other embodiments. The microphone is operatively connected to a transmitter 538 that is operatively connected to an antenna 540. Both the transmitter and the antennae are supportedly connected to the shock insulating material 536. The video camera 524 is also operatively connected to the transmitter 538. Both the microphone 538 and the video camera 524 send their respective signals to the transmitter that communicates them to a monitoring unit via an antennae.

The module 500 further includes a heat/cool unit 542 that provides environmental control to the housing interior. The heat/cool unit works generally the same as previously described. The heat/cool unit maintains the interior of the housing within an acceptable temperature range for the operation of the electronics.

Figure 35:
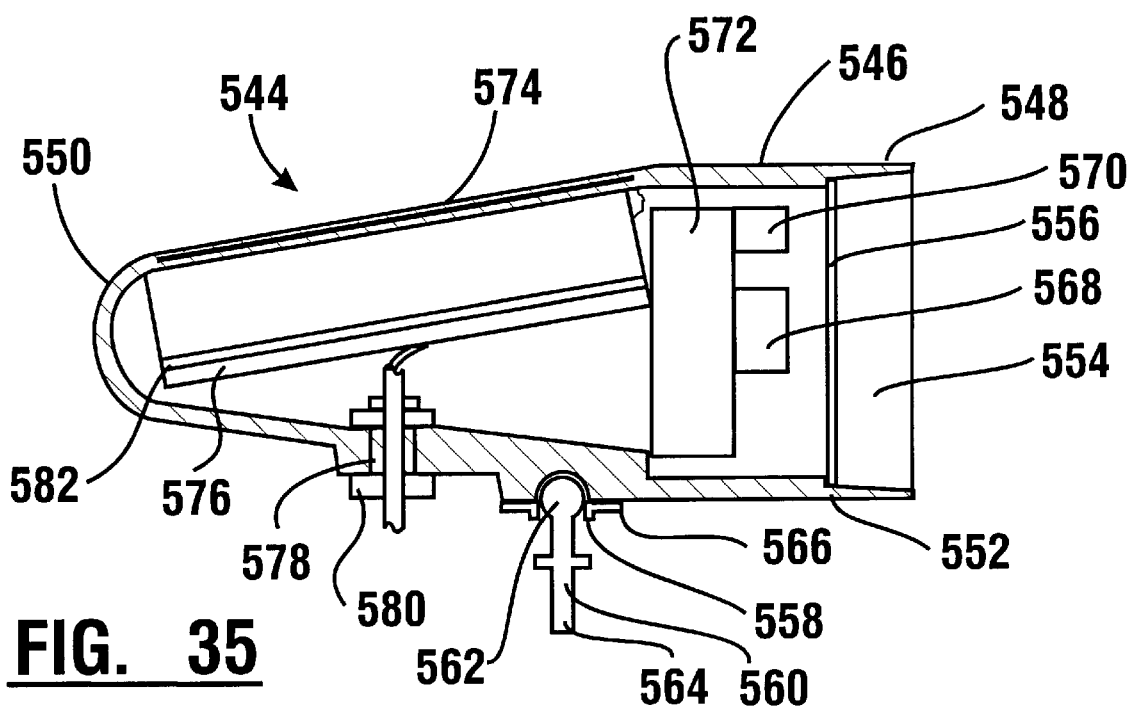
FIG. 35 is a cross sectional view of a sixth embodiment of the audio video transmission module of the present invention taken along Section A of FIG. 34.
Figure 34:
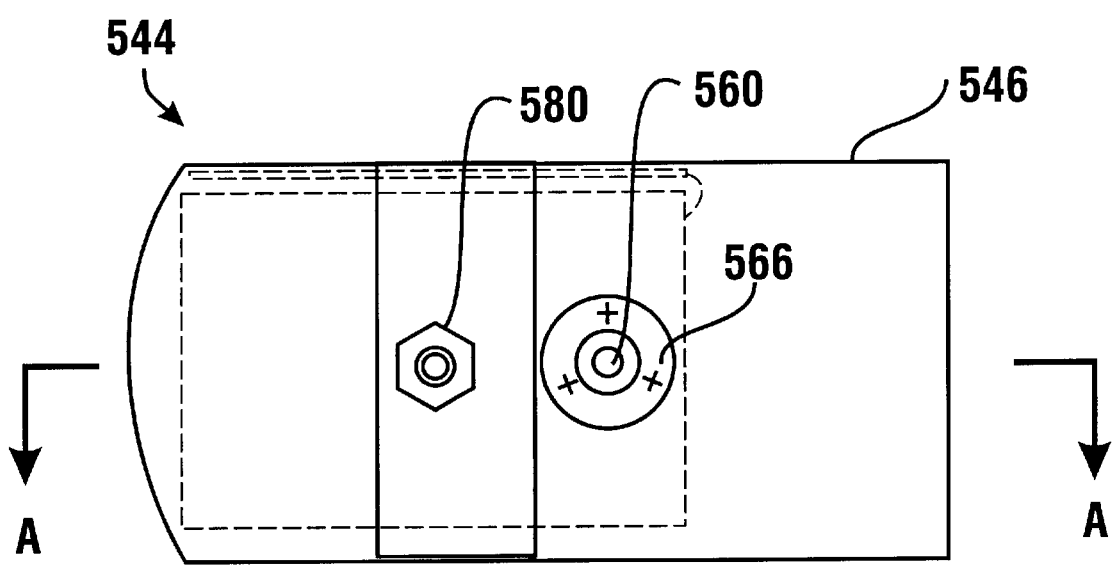
FIG. 34 is a bottom view of the sixth embodiment of the audio video transmission module of the present invention.

A sixth embodiment of the audio-video transmission module 544 is shown in FIGS. 34 and 35. This alternative embodiment also functions as a spot mirror. The module 544 includes a housing 546 that has an airfoil shape to provide aerodynamic properties.

The housing 546 includes a ring portion 548 and a body portion 550. The ring portion 548 is undercut to provide a ledge 552 that extends the circumference of the ring portion 548. The ledge generally surrounds a tapered opening 554.

The module 544 further includes a lens 556 that is fit against ledge 552 in opening 554. The lens is secured against the ledge with silicone adhesive to provide a moisture barrier. The lens 556 is preferably a one way convex mirror. The convex mirror shape allows the module to function as a conventional spot mirror. The one way functionality of the lens 556 allows light to be transmitted to the audio-video components of the module 544 positioned within the housing. The mirrored lens also prevents the viewing of the internal components from outside the housing. Alternatively the lens can be colored black or covered with a black mesh to obscure any view of the internal components of the module.

The body portion 550 includes a semi-spherical shaped groove 558 that is located centrally on the bottom of the housing. The module 544 further includes a stud 560 for attachment of the module 544 to a bracket located on the vehicle. The stud 560 includes a generally spherical first end 562 and a generally cylindrical second end 564. The second end 564 is adapted for attachment to the vehicle bracket.

The first end 562 of the stud 560 is positioned within the groove 558 in a ball and socket arrangement. This arrangement allows the stud to rotate universally within the groove 558. The first end 562 is retained within the groove by a capture plate 566. The capture plate is secured to the body portion by fasteners that are connected to the body portion.

The module 544 further includes a video camera 568, which is positioned within the housing to accept the light through the lens. The module 544 further includes a microphone 570. Both the video camera 568 and the microphone 570 are operatively connected to a transmitter 572. The video camera 568, microphone 570 and transmitter 572 are mounted within the housing on a shock insulation pad 576. The transmitter operates to send the signals to a mounting unit via an antennae 574.

In the preferred embodiment of the module 544 the antennae 574 is molded into the plastic body portion 540. Alternatively the antennae is mounted externally on the housing when longer transmission distances are desired.

The body portion 550 includes an access portion 578 for the passage of an electrical conduit carrying the electrical power wires for the components within the housing. The access portion houses a bushing 580 that provides a moisture barrier for the access portion 578. The bushing is preferably a liquid proof bushing, part #3213 manufactured by Hayes Molded Products Inc. of Kenelworth N.J. or equivalent. The bushing along with the sealed lens and the antennae incorporated into the housing provide a water tight enclosure for the electrical components of the module 544.

The module 544 further includes a heat/cool unit 582 that operates in the manner previously described to maintain the temperature of the electrical components of the module within an acceptable range.

Thus, the new video and audio surveillance system of the present invention achieves the above stated objectives, eliminates difficulties encountered in the use of prior devices and systems, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature that is described as a means for performing a function shall be construed as encompassing any means capable of performing the stated function, and shall not be limited to the particular means shown in the foregoing description, or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

We claim:

1. Apparatus enabling viewing of surveillance areas in or adjacent to a motor vehicle, comprising:
   a transmission module comprising:
      a housing, wherein said housing has an interior area, said interior area bounded by a lens, wherein a surveillance area adjacent said housing is viewable from said interior area through said lens;
      a camera mounted in said interior area, wherein said camera is operative to view said surveillance area through said lens;
      a transmitter in operative connection with said camera, wherein said transmitter is operative to transmit video signals responsive to said camera;
      an electrically powered device in said housing, wherein said device is not operatively associated with said camera or said transmitter, said
      device being powered through at least one electrical line, wherein said transmitter is operatively connected with said electrical line, said transmitter responsive to signals superimposed on said line to control a condition of said transmitter.

2. The apparatus according to claim 1, wherein said housing includes a light of said vehicle.

3. The apparatus according to claim 1, wherein said housing includes a vehicle mirror.

4. The apparatus according to claim 1, wherein said transmitter includes a radio transmitter.

5. The apparatus according to claim 1, wherein said device includes a light bulb.

6. The apparatus according to claim 1 and further comprising a microphone in said housing, wherein said transmitter transmits audio and video signals responsive to said microphone and said camera, respectively.

7. The apparatus according to claim 1, wherein said transmitter transmits a signal signature with said video signals.

8. The apparatus according to claim 7, wherein said apparatus further comprises a decoder switch, wherein said decoder switch is in operative connection with said electric line and said transmitter, and wherein said decoder switch is operative to control the condition of said transmitter responsive to said superimposed signals.

9. The apparatus according to claim 1, wherein said superimposed signals include the frequency shift key modulated carrier.

10. The apparatus according to claim 1 and further comprising a rechargeable battery in said housing, wherein said rechargeable battery is in operative connection with said transmitter, and further comprising a current controller in operative connection with said electrical line, wherein said current controller is operative to charge said battery using power from said electrical line.

11. The apparatus according to claim 1 and further comprising a heater device in said interior area of said housing.

12. The apparatus according to claim 1 and further comprising a cooling device in said interior area of said housing.

13. The apparatus according to claim 1 and further comprising a heater/cooler device in said interior area of said housing.

14. The apparatus according to claim 13, wherein said heater/cooler device is a Peltier Effect heater/cooler.

15. The apparatus according to claim 1 and further comprising a humidity control device in said interior area of said housing.

16. The apparatus according to claim 15, wherein said humidity control device is replaceable moisture absorbent material.

17. The apparatus according to claim 1 and further comprising a wiper in operative connection with said lens.

18. The apparatus according to claim 17, wherein said wiper is operative responsive to said superimposed signals.

19. The apparatus according to claim 18, wherein said wiper comprises a rotatable ring adjacent said lens, wherein rotation of said ring is operative to wipe said lens.

20. The apparatus according to claim 1 and further comprising a plurality of said modules, said modules operative to view different surveillance areas, and wherein said superimposed signals are operative to selectively turn the transmitters in each of said modules on and off.

21. The apparatus according to claim 20, wherein all of said transmitters in said modules transmit said video signals on the same frequency.

22. The apparatus according to claim 21, wherein each of said modules transmits a signal signature with said video signals.

23. The apparatus according to claim 20 and further comprising a monitor unit, including a screen, wherein said video signals from said modules are received by said monitor unit and said screen is operative to display images responsive to said video signals, and wherein said monitor unit is operative to place said superimposed signals on said electrical line.

24. The apparatus according to claim 23, wherein said monitor unit is in operative connection with a plug connector engagable with an electrical cigarette lighter, wherein said monitor unit places said superimposed signals on said electrical line through said plug connector.

25. The apparatus according to claim 23, wherein said superimposed signals include a shift key modulated carrier.

26. The apparatus according to claim 23, wherein said monitor unit is in operative connection with an image reversal circuit, wherein said image reversal circuit is operative to reverse said images.

27. The apparatus according to claim 23, wherein said monitor unit is in operative connection with a scan oscillator, wherein said scan oscillator is operative to selectively activate said transmitters in said modules.

28. The apparatus according to claim 23, wherein each of said transmitters transmits a signal signature, and wherein said monitor unit is in operative connection with a scanning circuit, wherein said monitor unit is operative to display an image responsive to video signals from a module only if said module transmits said signal signature.

29. The apparatus according to claim 23, wherein at least one of said modules includes a microphone, and wherein said transmitter of said one module transmits video and audio signals, and wherein said monitor unit is in operative connection with at least one speaker, and wherein said speaker generates sound responsive to said audio signals.

30. The apparatus according to claim 29 and further comprising a filter circuit or a gain circuit, wherein said filter or gain circuit are operative respectively to attenuate sounds detected by said microphone within a first selected range of frequencies and to amplify sounds detected by said microphone within a second selected range of frequencies.

31. The apparatus according to claim 1 and further comprising at least one transparent removable layer on an exterior surface of said lens, whereby said layer is removable when viewing therethrough is obscured.

32. The apparatus according to claim 27, wherein at least one of said modules includes a microphone, and wherein said module transmits video and audio signals, and wherein said monitor unit is in operative connection with a speaker, and wherein said scan oscillator is operative to cause said monitor unit to output images and sounds responsive to signals from each module in a sequence.

33. The apparatus according to claim 32, wherein said sequence is programmable.

34. The apparatus according to claim 32, wherein said monitor unit is in operative connection with a manual selection device, wherein said manual selection device overrides said sequence.

35. Apparatus for viewing areas adjacent a motor vehicle comprising:

a monitor unit mounted on said vehicle, said monitor unit including a screen for displaying images;

a plurality of transmission modules disposed on said vehicle, each of said modules including a camera and a transmitter wherein each transmitter transmits wireless signals;

a discrimination device in operative connection with the monitor unit, wherein the discrimination device is operative to discriminate the wireless signals from each of the transmitters on the vehicle from other wireless signals, and wherein said monitor unit selectively displays images on said screen responsive to said wireless signals from each of said transmission modules.

36. The apparatus according to claim 35, wherein each of said modules transmits signals at a different frequency, and wherein said monitor unit is operative to receive said different frequency signals.

37. The apparatus according to claim 35 and further comprising at least one of a radar detector, a motion detector, a sound detector, a flame detector, a smoke detector, or a temperature detector in operative connection with at least one said transmitter, wherein detection by said one detector is operative to cause said one transmitter to transmit said video signals.

* * * * *